US009568377B1

(12) United States Patent
Ohodnicki, Jr. et al.

(10) Patent No.: US 9,568,377 B1
(45) Date of Patent: Feb. 14, 2017

(54) NANOCOMPOSITE THIN FILMS FOR OPTICAL TEMPERATURE SENSING

(71) Applicants: Paul R. Ohodnicki, Jr., Alison Park, PA (US); Thomas D. Brown, Finleyville, PA (US); Michael P. Buric, Pittsburgh, PA (US); Christopher Matranga, Pittsburgh, PA (US)

(72) Inventors: Paul R. Ohodnicki, Jr., Alison Park, PA (US); Thomas D. Brown, Finleyville, PA (US); Michael P. Buric, Pittsburgh, PA (US); Christopher Matranga, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 404 days.

(21) Appl. No.: 14/177,306

(22) Filed: Feb. 11, 2014

Related U.S. Application Data

(60) Provisional application No. 61/763,548, filed on Feb. 12, 2013, provisional application No. 61/860,342, filed on Jul. 31, 2013.

(51) Int. Cl.
| | |
|---|---|
| *G01K 11/00* | (2006.01) |
| *G01J 5/00* | (2006.01) |
| *G01K 11/12* | (2006.01) |
| *B82Y 15/00* | (2011.01) |

(52) U.S. Cl.
CPC .............. *G01K 11/12* (2013.01); *B82Y 15/00* (2013.01); *Y10S 977/955* (2013.01)

(58) Field of Classification Search
USPC ........................................ 374/161, 120, 121
See application file for complete search history.

(56) References Cited

U.S. PATENT DOCUMENTS

| | | | |
|---|---|---|---|
| 7,690,842 B2 * | 4/2010 | Bawendi ................ | G01K 11/20 252/301.4 R |
| 8,411,275 B1 * | 4/2013 | Ohodnicki, Jr. et al. ................. | G01N 21/554 356/437 |
| 8,568,027 B2 * | 10/2013 | Ivanov et al. ......... | B82Y 30/00 374/143 |

(Continued)

*Primary Examiner* — Mirellys Jagan
(74) *Attorney, Agent, or Firm* — Jacob A. Heafner; Michael J. Dobbs; Brian J. Lally

(57) ABSTRACT

The disclosure relates to an optical method for temperature sensing utilizing a temperature sensing material. In an embodiment the gas stream, liquid, or solid has a temperature greater than about 500° C. The temperature sensing material is comprised of metallic nanoparticles dispersed in a dielectric matrix. The metallic nanoparticles have an electronic conductivity greater than approximately $10^{-1}$ S/cm at the temperature of the temperature sensing material. The dielectric matrix has an electronic conductivity at least two orders of magnitude less than the dispersed metallic nanoparticles at the temperature of the temperature sensing material. In some embodiments, the chemical composition of a gas stream or liquid is simultaneously monitored by optical signal shifts through multiple or broadband wavelength interrogation approaches. In some embodiments, the dielectric matrix provides additional functionality due to a temperature dependent band-edge, an optimized chemical sensing response, or an optimized refractive index of the temperature sensing material for integration with optical waveguides.

19 Claims, 16 Drawing Sheets

(56) References Cited

U.S. PATENT DOCUMENTS

| | | | |
|---|---|---|---|
| 8,638,440 B1* | 1/2014 | Ohodnicki, Jr. et al. ................... | G01N 21/783 356/437 |
| 9,267,853 B2* | 2/2016 | Fernandes ............... | G01J 5/046 |
| 2003/0030067 A1* | 2/2003 | Chen .................... | C09K 11/574 257/102 |
| 2007/0189359 A1* | 8/2007 | Chen ...................... | B82Y 30/00 374/161 |
| 2009/0304905 A1* | 12/2009 | Graham et al. ...... | B05D 3/0254 427/8 |
| 2010/0044586 A1* | 2/2010 | Duhr ................. | B01L 3/502761 250/459.1 |
| 2014/0092464 A1* | 4/2014 | Arsenault et al. ..... | B82Y 20/00 359/290 |
| 2014/0105242 A1* | 4/2014 | Fernandes ............. | G01J 5/046 374/45 |
| 2015/0110150 A1* | 4/2015 | Schmidt ............. | G01N 21/1717 374/43 |
| 2016/0018269 A1* | 1/2016 | Maurer .................. | G01K 11/20 374/121 |

\* cited by examiner

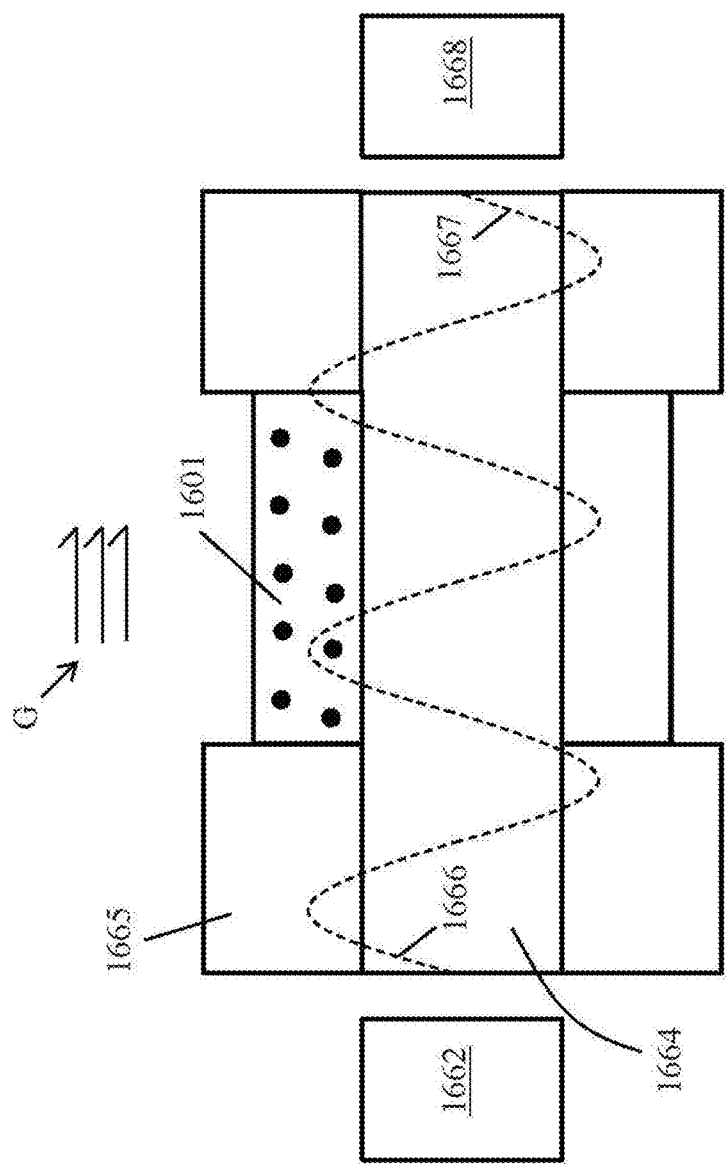

NANOCOMPOSITE THIN FILMS FOR OPTICAL TEMPERATURE SENSING

RELATION TO OTHER APPLICATIONS

This patent application claims priority from provisional application 61/763,548 filed Feb. 12, 2013 and provisional application 61/860,342 filed Jul. 7, 2013, which are hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relates to a method for sensing changes to the temperature of a temperature sensing material by utilizing changes in the optical properties of a nanocomposite thin film material consisting of metallic particles dispersed within, below, or above a matrix phase. In certain embodiments, the temperature sensing material additionally provides an optical response to chemical composition that can be simultaneously monitored with temperature by multiple wavelength interrogation.

BACKGROUND

The enhancement of EM fields in the vicinity of metallic nanoparticles and metallic nanostructures can be explained by the phenomenon of localized surface plasmon resonance. The shape and magnitude of associated features measured in the transmission or reflection spectra from these metallic structures depend on the enhanced scattering and absorption of light at specific wavelengths. The details of the extinction cross-section enhancement over a finite wavelength range is affected by several different factors that include the characteristic optical constants and geometry of the nanostructures illuminated by incident light as well as the optical constant of the surrounding matrix phase.

The origin of plasmon resonances are collective oscillations of the conduction band electrons, and they result from the presence of interfaces for nanoparticles and films of a select group of materials which include the noble metals Ag, Cu, and Au as well as the so-called transparent conducting metal oxides that include Sn-doped $In_2O_3$ (ITO), Al-doped ZnO (AZO), and Nb-doped $TiO_2$ (NTO). Localized surface plasmons are excited when light is incident on metallic nanoparticles which typically have dimensions smaller than the wavelength of the incident light. At certain characteristic wavelengths, one or more resonant modes are excited in the nanoparticles, leading to a significant enhancement in absorbed and scattered light and a strong increase in the electromagnetic fields in the vicinity of the particles. Localized surface plasmons can be detected as resonance peaks in the absorption and scattering spectra of the metallic nanoparticles. Nanostructures made up of noble metals, such as gold, silver, and copper, and the more recently discovered conducting metal oxides such as ITO, AZO, and NTO are well known to exhibit localized surface plasmon resonance (LSPR) phenomena.

The collective oscillation of the free electrons is also sensitive to changes in the size and shape of the particle. For example, gold nanoparticles embedded in a transparent matrix phase with a real dielectric constant similar to that of $SiO_2$ ($\epsilon$~2.25) and average diameters in the range of approximately 5-10 nm, strongly absorb at visible wavelengths with a maximum absorbance near 520 nm. In this particular case, the energy required to excite the surface plasmon lies in the visible region of the spectrum but the surface plasmon resonance energy can also be tuned to occur at wavelengths ranging from ultraviolet to near-infrared. With increases in the Au particle size, a shift in the peak of the optical absorption to longer wavelengths is observed due to the excitation of higher-order resonant modes. The relative magnitude of the scattering cross-section also increases as compared to the absorption cross-section resulting in particles that strongly scatter light rather than absorb it for particle sizes approaching 100 nm. The plasmon resonance band is also sensitive to particle shape. For example, an elliptical or rod-shaped particle can exhibit two characteristic plasmon resonance bands at distinct wavelengths depending upon the orientation of the particle with respect to the polarization state of incident electromagnetic radiation. In addition to being size- and shape-dependent, the plasmon resonance band is sensitive to changes in the dielectric properties of the surrounding medium. For transparent matrix media with large dielectric constants, the energy required to collectively excite the electrons is decreased thereby shifting the peak in the extinction cross-section to lower energies and longer wavelengths.

The strong dependence of the optical extinction peak on a number of material dependent parameters provides the nanoparticles with an inherent sensing ability. For visible light, generally only changes in refractive index occurring at distances within about 200 nm of the particle surface result in changes to the optical properties of the nanoparticles. The plasmon resonance behavior of nanoparticles are particularly sensitive to adsorption directly on the particle surface and hence biological sensing based on analyte absorption by nanoparticles and subsequent modifications of the absorbance maximum is currently an area of significant effort.

Changes in the absorbance maxima generated by the localized surface plasmon resonance effect have also been utilized extensively for gas sensing applications in the low and intermediate temperature ranges. A select few researchers in the field have also applied Au incorporated films to optical gas sensing at higher temperatures. Current technical literature suggests that the gas sensing response of technically useful noble metal/metal oxide composite films depend significantly upon the selection of a matrix phase that can play an active role in the gas sensing process. Two potential ways that such an active role can be played include (1) a change in the free carrier density of the matrix phase followed by an electronic charge transfer from the matrix to the nanoparticle and (2) a change in the effective dielectric constant of the matrix phase. Both of these effects would result in a modification to the extinction peak of noble metal nanoparticles associated with the localized surface plasmon resonance effect that could be detected through optical based monitoring techniques. However, direct interactions between the metallic nanoparticles and chemical constituents of the ambient gas atmosphere may also be important under certain testing conditions. For example, direct adsorption of chemical species on Au nanoparticles resulting in electronic charge transfer may impart significant modifications to the extinction peak of Au-nanoparticles in the case of Au-nanoparticle incorporated inert oxides such as $SiO_2$ and $Al_2O_3$ where interactions between the matrix and the ambient atmosphere are significantly reduced as compared to catalytically active and reducible oxides such as $TiO_2$, YSZ, and ZnO. Such direct interactions are expected to be particularly important in the case of conducting metal oxide nanoparticle incorporated films as relatively large changes in free carrier density of the conducting metallic oxides in response to changes in the chemical composition of ambient gas atmospheres at elevated temperatures have been observed.

For high temperature (T>~500° C.) optical gas sensing, Au nanoparticles have been embedded in catalytically active, reducible, and oxygen ion conducting matrices such as $TiO_2$ or yttria-stabilized zirconium (YSZ). Dielectric matrix phases with a relatively wide bandgap and low oxygen ion and electronic conductivity commonly referred to in the literature as "inert" such as $SiO_2$, $Al_2O_3$, and $Si_3N_4$ are expected to exhibit improved temperature and chemical stability. Recent work has therefore also employed Au nanoparticles embedded in an inert oxide matrix such as $SiO_2$ and $Al_2O_3$ for gas sensing at temperatures as high as approximately 900° C. For lower temperatures, gold nanoparticles have been embedded in matrices of even more highly reducible oxides such as NiO, $WO_3$, or CuO. See e.g., Sirinakis et al., "Development and Characterization of Au-YSZ Surface Plasmon Resonance Based Sensing Materials: High Temperature Detection of CO," *J. Phys. Chem. B* 110 (2006); and see Ohodnicki et al., "Plasmonic Nanocomposite Thin Film Enabled Fiber Optic Sensors for Simultaneous Gas and Temperature Sensing at Extreme Temperatures", *Nanoscale* 5 (19) (2013); and see Ando et al., "Optical CO sensitivity of Au-CuO composite film by use of the plasmon absorption change," *Sensors and Actuators B* 96 (2003); and see U.S. Pat. No. 7,864,322 B2 to Carpenter et al.; and see U.S. Pat. No. 8,411,275 B1 to Ohodnicki et al.

In addition to noble metals that are commonly known to exhibit a surface plasmon resonance, oxides with a relatively high electronic conductivity have also been demonstrated to exhibit pronounced surface plasmon resonances. These material systems have also been demonstrated to display enhanced high temperature optical gas sensing responses as compared to corresponding oxide systems with a relatively low electronic conductivity and free carrier concentration. See e.g. Ohodnicki et al., "Plasmonic transparent conducting metal oxide nanoparticles and nanoparticle films for optical sensing applications", Thin Solid Films 539 (2013); also see U.S. Pat. No. 8,638,440 to Ohodnicki et al. Optical sensors based upon this class of materials may show improved stability under high temperature and/or chemically aggressive harsh environment conditions in some cases due to a relatively high melting point as compared to the noble metals Ag and Au and a potential for improved corrosion resistance under certain conditions.

The temperature of a gas stream is another parameter that is important to measure in addition to the chemical composition and many different types of temperature sensors have been demonstrated and are used in practice for such applications. For example, thermocouples and resistive temperature detectors are traditional temperature sensing devices that are widely employed in which temperature can be monitored by an electrical signal that consists of a current or voltage. In many cases, it would be advantageous to monitor temperature through optical means without the need for electrical wires or signals at the location where the temperature is being monitored. For example, the use of electrical wires and signals presents a potential safety hazard in the case of flammable gas atmospheres. As another example, application of electrical based sensors in extreme high temperature environments greater than approximately 500° C. can require expensive insulation, electrical wiring, and interconnections which are also a common source of sensor failure under high temperature conditions. To overcome the disadvantages and limitations of such traditional temperature sensing approaches, a number of optical based temperature sensor methodologies have been developed. Methodologies that are compatible with optical waveguide based sensing platforms such as optical fibers for remote and distributed sensing capability are particularly advantageous. One approach to optical temperature sensing that has been explored by prior investigators consists of the development of sensors that enable monitoring of the optical transmittance or reflectance of metallic or dielectric materials. For example, an optical temperature sensor based upon measuring the temperature dependent reflected signal from an end-coated and cleaved optical fiber of a monolithic film of a dielectric material such as $TiO_2$ with a temperature dependent refractive index has been reported. Optical temperature sensors based upon a temperature dependent band-gap of a dielectric material such as ZnO have also been reported. See e.g., M. Naci Inci et al., "A fibre-optic thermometric sensor based on the thermo-optic effect of titanium dioxide coatings", Optics & Laser Technology 29 (3) (1997); and see e.g. S. Chenghua et al., "Optical temperature sensor based on ZnO thin film's temperature dependent optical properties", Rev. Sci. Instrum. 82 (2011). Temperature sensors that are based upon monitoring the optical reflectance of continuous thin films of a metal such as Au or Ag which are well known to display a surface plasmon resonance have also been proposed and are advantageous due to a relatively high theoretical sensitivity of optical transmittance or reflectance to temperature. See e.g. S. Ozdemir et al., "Temperature Effects on Surface Plasmon Resonance: Design Considerations for an Optical Temperature Sensor", Journal of Lightwave Technology 21 (3) (2003); and see e.g. A. Sharma et al., "Theoretical model of a fiber optic remote sensor based on surface plasmon resonance for temperature detection", Optical Fiber Technology 12 (2006). Such approaches can be effective for monitoring of temperature under certain conditions, but it would be advantageous to provide an alternative optical-based methodology that employs temperature sensing materials which exhibit improved temperature stability, chemical stability, and/or additional functionality as compared to continuous films of a dielectric material such as ZnO or TiO2 or continuous films of a metal displaying a surface plasmon resonance such as Ag or Au. It would be further advantageous if the optical methodology were relevant for monitoring of temperature over a broad range of temperatures spanning from cryogenic to extreme, high temperature conditions greater than approximately 500° C. by monitoring the optical properties of the nanocomposite.

Such advantages can be provided by metal nanoparticle incorporated dielectric nanocomposite materials of the type extensively investigated for elevated temperature chemical sensing applications such as Au/TiO2, Au/YSZ, and Au/SiO2. An optical temperature sensor employing a subset of such materials systems has been discussed theoretically by previous authors, but in that case the temperature sensing mechanism involved a particle size that varied with temperature due to coarsening. Such temperature dependent particle coarsening would impart a time-dependent optical signal at fixed temperature and an irreversible temperature response with increasing temperature that would prevent a useful and reversible temperature sensing response. See e.g. S. K. Srivistava et al., "Simulation of a localized surface plasmon resonance based fiber optic temperature sensor", Journal of the Optical Society of America 27 (7) (2010). It would instead be advantageous to employ metal nanoparticle incorporated sensor materials for which the particle size does not vary significantly under the testing conditions employed. Stabilization of the particle size can be achieved, for example, through dielectric matrix selection (thickness, composition, etc.) and high temperature pre-treatments of the nanocomposite temperature sensor material. See e.g. Ohodnicki et al., "Plasmonic Nanocomposite Thin Film Enabled Fiber Optic Sensors for Simultaneous Gas and Temperature Sensing at Extreme Temperatures", *Nanoscale* 5 (19) (2013); also see Ohodnicki et al., "Plasmon Resonance at Extreme Temperatures in Sputtered Au Nanoparticle Incorporated TiO2 Films", Proceedings of SPIE Optics and Photonics 8456 (2012); also see Buric et al., "Theoretical and experimental investigation of evanescent wave absorption sensors for extreme temperature applications", Proceedings of SPIE Optics and Photonics 8816 (2013); also see Buric et al., "Optical fiber evanescent absorption sensors for high-temperature gas sensing in advanced coal-fired power plants", Proceedings of SPIE Optics and Photonics 8463 (2012).

It would be further advantageous if an optical interrogation methodology allowed for multiple parameters to be monitored simultaneously through multiple wavelength interrogation in these and related materials by exploiting the detailed wavelength dependence of optical properties of a nanocomposite material. For example, it would be advantageous if such an optical interrogation methodology would allow for simultaneous monitoring of the temperature and chemical composition of a gas stream or a liquid phase.

Under most conditions, nanoparticles of metals such as Pd, Pt, Rh, Ru, Os, and Ir do not display a pronounced absorption or scattering localized surface plasmon resonance. As such, nanocomposite films consisting of nanoparticles of these metals dispersed in a dielectric matrix phase have not been extensively investigated for optical sensing applications. However, many of these metals exhibit relatively high melting points as compared to the noble metals Au and Ag for which localized surface plasmon resonances are well known to occur. It would therefore be advantageous to develop materials with useful high temperature optical sensing responses based upon this class of materials, particularly for applications in the most demanding temperature ranges where typical noble metals such as Ag and Au may undergo melting Disclosed here is a method for temperature sensing utilizing optical signal shifts that are associated with temperature dependent optical properties of a metal nanoparticle incorporated nanocomposite material. The temperature sensing material is comprised of a plurality of metallic nanoparticles dispersed in a dielectric matrix. The method disclosed offers significant advantage over materials typically utilized for temperature sensing, including enhanced thermal and chemical stability of the dielectric matrices due to embedded metallic nanoparticles, increased chemical and size stability of metallic nanoparticles embedded in a dielectric matrix, and the capability for simultaneous monitoring of temperature and chemical composition of a gas stream or a liquid through multiple wavelength interrogation, among other advantages. In addition, several candidates for dielectric matrix materials (e.g. $SiO_2$, $Al_2O_3$, $MgF_2$ doped $SiO_2$, mixed $SiO_2/Al_2O_3$) exhibit relatively low values of refractive indices for fully densified films ranging from less than ~1.5 to greater than ~1.7. This property is advantageous as it enables integration of nanocomposite films directly with optical fiber based sensors as a gas sensitive cladding layer in an evanescent wave absorption spectroscopy based sensing configuration, while maintaining the conditions necessary for waveguiding in the low refractive index core material. These and other objects, aspects, and advantages of the present disclosure will become better understood with reference to the accompanying description and claims.

SUMMARY

The disclosure provides a method for temperature sensing by utilizing temperature dependent optical properties of a temperature sensing material, where the temperature sensing material is comprised of a plurality of metallic nanoparticles dispersed in a transparent dielectric matrix. The temperature sensing material may be in thermal or direct contact with a monitored stream comprised of fluid constituents having a concentration and temperature which may vary over time. The temperature sensing material exhibits changes in optical properties in response to changes to the temperature of the monitored stream. In another embodiment, multiple wavelength monitoring is employed to simultaneously extract information about the temperature and chemical composition of a monitored stream. The temperature sensing material may also be embedded in and in thermal communication with a liquid or gas phase in which the temperature and chemical composition may vary over time. The temperature sensing material may also be embedded in and in thermal communication with a solid phase in which the temperature may vary over time. In an embodiment, the temperature sensing material has a temperature greater than about 500° C. The temperature sensing material is comprised of metallic nanoparticles having an average nanoparticle diameter of less than about 500 nanometers with a conductivity of greater than approximately $10^{-1}$ S/cm as measured at the temperature of the temperature sensing material. Preferably, the conductivity of the metallic nanoparticles are greater than $10^0$ S/cm at the temperature of the temperature sensing material, more preferably greater than $10^1$ S/cm, even more preferably greater than $10^2$ S/cm, and most preferably greater than $10^3$ S/cm. The nanoparticles are dispersed in a dielectric matrix phase with an electronic conductivity at least two orders of magnitude less than the metallic nanoparticles at the temperature of the temperature sensing material. For example, if the metallic nanoparticles exhibit an electronic conductivity of $10^{-1}$ S/cm at the temperature of temperature sensing material, the dielectric matrix will exhibit an electronic conductivity of less than approximately $10^{-3}$ S/cm as measured at the same temperature. For high temperature applications in optical waveguide based sensors in which the temperature sensing material or a monitored gas stream, liquid, or solid is at a temperature of greater than approximately 500° C., exemplary inert matrix materials include $SiO_2$, $Al_2O_3$, and $Si_3N_4$ as well as derivatives such as $MgF_2$ doped $SiO_2$, and mixtures of $SiO_2/Al_2O_3$. In certain embodiments, matrix materials are specifically chosen to optimize the effective refractive index of the temperature sensing material for use as temperature sensitive cladding layers in optical waveguide based sensors. In certain embodiments, matrix materials are specifically chosen in order to provide additional functionality to the nanocomposite material by allowing for simultaneous monitoring of the chemical composition of the monitored gas stream or liquid through multiple wavelength monitoring interrogation. Depending upon the particular embodiment, the primary role of the matrix phases will be one or multiple of the following: (1) to mitigate the coarsening of metallic nanoparticles under any high temperature conditions, (2) to impart chemical corrosion and oxidation/reduction resistance and stability of metallic nanoparticles under chemically corrosive, highly oxidizing, and/or highly reducing conditions, (3) to tailor the effective refractive index of the nanocomposite thin film for optimized sensing response when integrated with an optical waveguide based sensing platform, and (4) to impart additional functionality to the temperature sensing material such as enabling simultaneous monitoring of the chemical composition of a monitored gas stream in addition to temperature using multiple wavelength monitoring. The temperature sensing material utilized in the method of this disclosure may be prepared using means known in the art for the production of metallic nanoparticles dispersed within a supporting matrix, including sol-gel based wet chemistry techniques, impregnation techniques, implantation techniques, sputtering techniques, and others. The temperature sensing material may be deposited as a single monolithic layer or through multi-layered deposition involving a single technique or a combination of several film deposition techniques. The temperature sensing material and the associated method disclosed offers significant advantages over alternative temperature sensing approaches by eliminating the need for electrically conducting wires and compatibility with distributed sensing approaches when integrated with optical based sensing platforms such as optical fibers. In certain embodiments, the usage of nanocomposite materials for high temperature applications also has advantages of improved matrix stability as compared to monolithic films of the constituent dielectric matrix phases in the absence of embedded metallic nanoparticles as well as monolithic films of the constituent metallic phases.

The novel process and principles of operation are further discussed in the following description.

BRIEF DESCRIPTION OF THE DRAWINGS

FIG. 16 illustrates an embodiment of the temperature sensing material deposited on an optical waveguide.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for sensing changes to a temperature based on changes to the optical properties of a temperature sensing material comprised of metallic nanoparticles dispersed in a dielectric matrix.

The disclosure provides a method for sensing changes to a temperature by utilizing the changes to the optical properties of a particular temperature sensing material. The temperature sensing material is comprised of a plurality of metallic nanoparticles dispersed in a dielectric matrix. The method disclosed offers significant advantages over alternative temperature sensing materials comprised of continuous metal films such as Au or monolithic dielectric matrices such as $TiO_2$ or ZnO in the absence of incorporated metallic nanoparticles to form a nanocomposite, including enhanced thermal and chemical stability, the ability to tune effective refractive indices in the range required to be compatible with optical waveguide based sensors, the ability to impart multi-functionality through appropriate matrix and metallic particle selection such as simultaneous temperature and chemical composition monitoring by multiple wavelength interrogation, and others.

Figure 1:
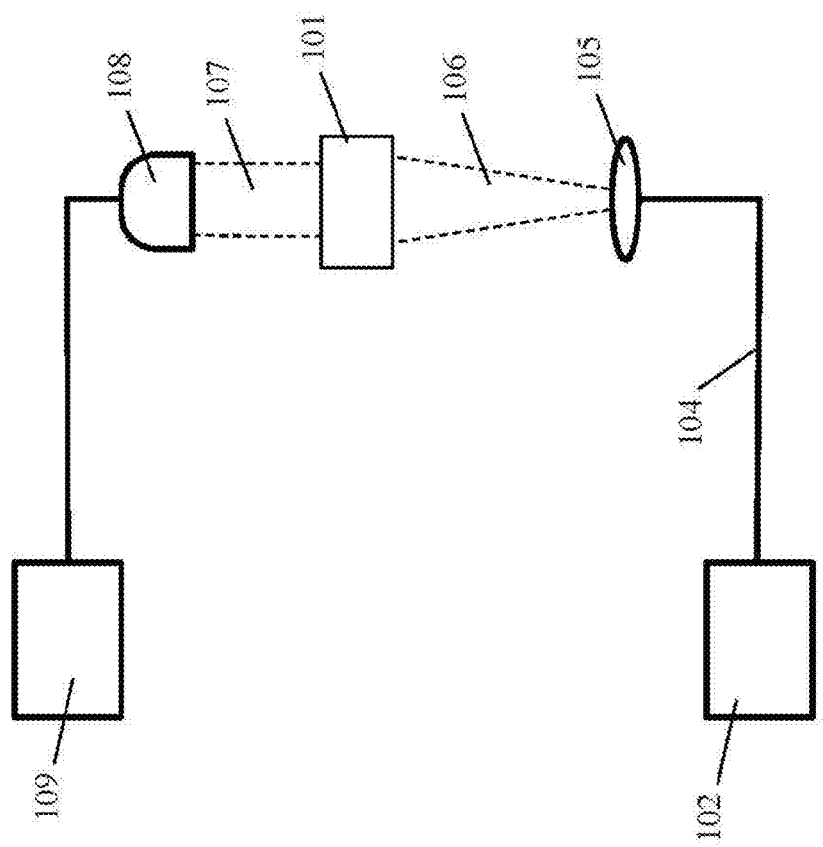
FIG. 1 illustrates the methodology of detecting a change in a temperature of a temperature sensing material.

The basic principles of the method are illustrated at FIG. 1. At FIG. 1, light from light source 102 is directed along an optical fiber 104 and focused by lens 105 producing incident light 106 illuminating temperature sensing material 101. Concurrently, exiting light 107 is collected behind the specimen using a probe 108 connected to a spectrophotometer 109. Data generated by spectrophotometer 109 or supporting equipment is processed, and an optical signal is displayed. The optical signal is a comparison of the incident light and the exiting light and indicates the absorption, transmission, reflection, and scattering of the incident light at certain wavelengths by temperature sensing material 101. The optical signal indicates selective photon absorption or scattering of light at certain wavelengths by temperature sensing material 101.

As will be further discussed, temperature sensing material 101 comprises a dielectric matrix having a plurality of metallic nanoparticles dispersed therein, where the dielectric matrix is stable and has an electronic conductivity at least two orders of magnitude lower than the dispersed metallic nanoparticles at the temperature of temperature sensing material 101, and where the plurality of metallic nanoparticles have an average nanoparticle diameter of less than about 500 nanometers, and individual metallic nanoparticles within the plurality have an electronic conductivity of greater than $10^{-1}$ S/cm at the temperature of temperature sensing material 101. Preferably, the conductivity of the metallic nanoparticles are greater than $10^0$ S/cm at the temperature of the temperature sensing material, more preferably greater than $10^1$ S/cm, even more preferably greater than $10^2$ S/cm, and most preferably greater than $10^3$ S/cm. Additionally, in an embodiment, the dielectric matrix has an electronic conductivity at least 3 orders of magnitude less than the metallic nanoparticles, and in another embodiment, the dielectric matrix has an electronic conductivity at least 5 orders of magnitude less than the metallic nanoparticles. A relatively high electronic conductivity of the metallic particles with a large contrast in electronic conductivity between the matrix phase and the dispersed metallic particles tends to result in pronounced optical features of the nanocomposite which are temperature dependent thereby resulting in a measurable optical signal shift. For example, localized surface plasmon resonances arise in some metallics due to the same free charge carriers responsible for electronic conductivity and they impart a particularly pronounced temperature dependent optical signal shift when embedded in a relatively low electronic conductivity matrix. Here, "the temperature of the temperature sensing material" as used above and herein means a temperature at which an optical signal is generated when temperature sensing material 101 is illuminated by incident light 106. In an embodiment, the temperature of the temperature sensing material is greater than or equal to 500° C. In certain embodiments, the dielectric matrix is comprised of $SiO_2$, $Al_2O_3$, $Si_3N_4$, $MgF_2$, or mixtures thereof. In additional embodiments the dielectric matrix is a conducting metal oxide. In further embodiments, the plurality of metallic nanoparticles comprise Pd, Pt, Ir, Rh, Ru, Os, Au, Ag, Al, Cu, or compounds or alloys thereof. In another embodiment, the average nanoparticle diameter is less than about 100 nanometers.

Figure 2:
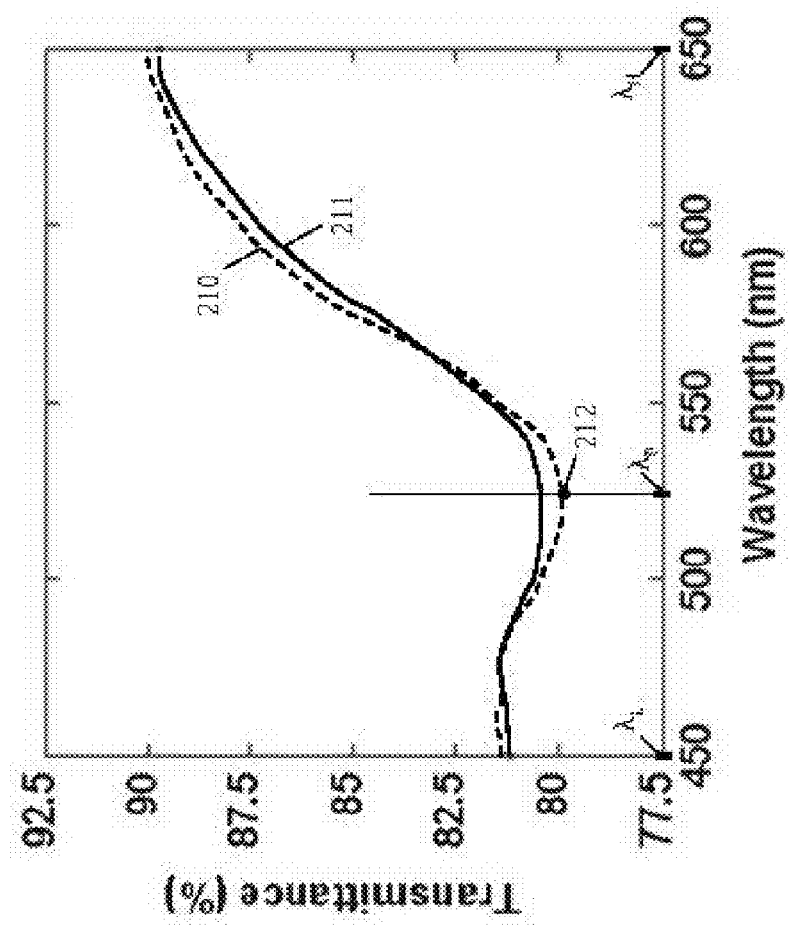
FIG. 2 illustrates an example of a change to the transmittance of a nanocomposite film in response to temperature changes of a surrounding gas stream.

Incident light 106, exiting light 107, and temperature sensing material 101 generate an optical signal which depends on the temperature of temperature sensing material 101, and shifts in the optical signal at monitored wavelengths are indicative of a change in temperature. As an example, FIG. 2 illustrates a transmittance spectrum 210 displaying a transmission minimum of generally around 525 nm associated with a plasmon resonance peak absorption for a temperature sensing material where the plurality of nanoparticles comprise Au and the dielectric matrix is $SiO_2$, when the temperature of the temperature sensing material is 600° C. In contrast, when the temperature of temperature sensing material is altered to a temperature of about 800° C., the transmittance spectrum changes to 211. Correspondingly, monitoring the optical signal generated by the temperature sensing material and detecting a shift in the optical signal provides a means by which the temperature of the temperature sensing material may be monitored. With respect to FIG. 2, the change in optical signal may be monitored through broadband wavelength interrogation and appropriate fitting procedures or through indirect measurements by monitoring film transmittance, reflectance, absorptance, or scattering at one or more selected wavelength(s).

Within this disclosure, "optical signal" means a comparison of light incident on the temperature sensing material and light exiting the temperature sensing material at one or more wavelengths using optical spectroscopy. The optical signal may be expressed as, for example, a transmittance at the one or more wavelengths, an absorption at the one or more wavelengths, or any other parameters which indicate the absorption, transmission, reflection, scattering or other optical impacts on the incident light as a result of interaction with the temperature sensing material. As is understood, optical spectroscopy based on a comparison of the incident light and the exiting light may indicate the absorption, transmission, reflection, scattering, and optical impacts which occur as a result of interaction between the incident light and the temperature sensing material. See e.g., Ingle, James D., and Stanley R. Crouch, *Spectrochemical analysis*, Englewood Cliffs, N.J.: Prentice Hall, 1988; see also Sole, Jose, *An Introduction to the Optical Spectroscopy of Inorganic Solids* (2005); see also Sarid, Dror and Challener, William, *Modern Introduction to Surface Plasmons: Theory, Mathematica Modeling, and Applications* (2010), among others.

Within this disclosure, a "shift in the optical signal" means a variation between an initial optical signal and a subsequent optical signal at one or more wavelengths, where the initial optical signal is generated at a first time and the subsequent optical signal is generated at a second time, and where both the initial optical signal and the subsequent optical signal are generated by illuminating the temperature sensing material with the light source emitting the incident light, collecting the exiting light, and comparing the incident light and the exiting light using optical spectroscopy. The shift in the optical signal may be recognized by detecting a variation between optical signals at any monitored wavelength or by variations at multiple wavelengths over a band of wavelengths. For example, the variation may be detected by monitoring a transmittance at a specific wavelength, the specific wavelength of an optical signal edge within a specified wave length range, the wavelength of an optical signal local maxima, a variation in the optical signal breadth, a variation in the optical signal amplitude, a variation in the optical signal full width at half maximum (FWHM), or any other techniques which may serve to indicate a variation between the initial optical signal and a subsequent optical signal. In an embodiment, the shift in the optical signal means a variation of at least 0.1% between an initial time-averaged optical signal and a subsequent time-averaged optical signal in transmittance, absorptance, or reflectance at a specific wavelength.

The shift in the optical signal as disclosed here is generally not constrained to a specific wavelength or band of wavelengths. As discussed, the shift in optical signal may be a shift at one specific wavelength, or may be a shift over a monitored band of wavelengths. For example, the shift may occur at one or more wavelengths typically considered to be ultraviolet, visible, or near-infrared as those terms are used in the art.

In some embodiments, the optical signal exhibits a plasmon resonance peak within a band of wavelengths, such as plasmon resonance peak 212 at FIG. 2, generally around 525 nm and within the band of wavelength from about 450 nm to about 650 nm. Within this disclosure, "plasmon resonance peak" means a maximum value of absorption and/or scattering or a minimum value of transmittance which occurs over a given band of wavelengths bounded by a wavelength $\lambda_L$ and a wavelength $\lambda_H$ where $\lambda_L<\lambda_H$, when a spectrum of incident light is compared to a spectrum of exiting light, and where the incident light is comprised of light illuminating the temperature sensing material, where the exiting light is comprised of some portion of the incident light transmitted or reflected by the temperature sensing material. A "plasmon resonance peak position" means a wavelength $\lambda_P$ at which the plasmon resonance peak occurs, where $\lambda_L<\lambda_P<\lambda_H$. For example, at FIG. 2 and as stated, a plasmon resonance peak where transmittance is at a minimum generally occurs around 525 nm, such that a plasmon resonance peak position is present at the wavelength $\lambda_P$ within the given band of wavelengths bounded by $\lambda_L$ and $\lambda_H$, where $\lambda_L<\lambda_P<\lambda_H$. Similarly, a "change in the plasmon resonance peak" means a wavelength shift from a first plasmon resonance peak position to a second plasmon resonance peak position. However, the exhibition of a plasmon resonance peak within a monitored band of wavelengths is not a requirement within this method, and shifts in the optical signal are not limited to changes in the plasmon resonance peak. Within this method, and as defined, the shift in the optical signal may be recognized by detecting a variation between optical signals at any monitored wavelength or by variations at multiple wavelengths over a band of wavelengths.

Figure 3:
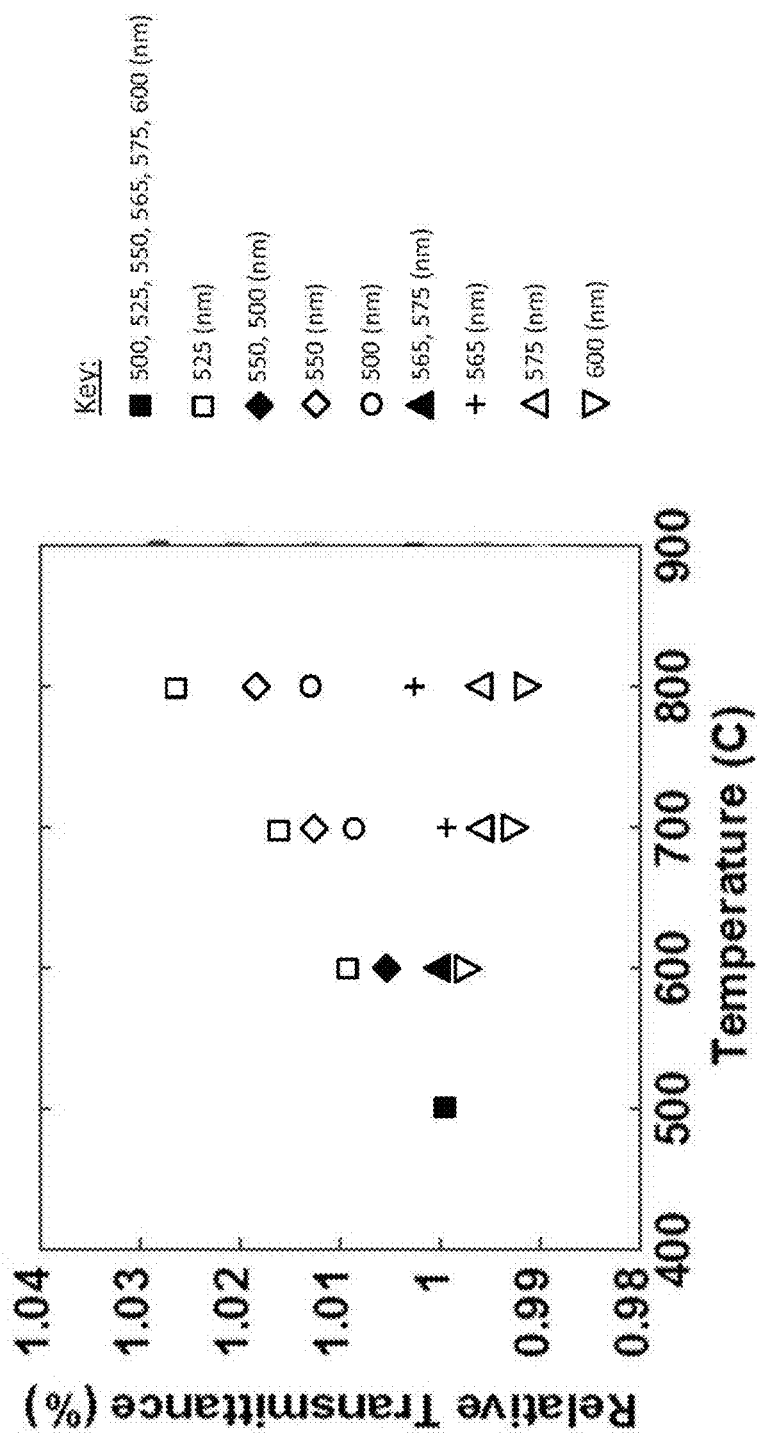
FIG. 3 illustrates the change in transmission characteristics in response to temperature at specific wavelengths for a fixed gas stream composition.

As a further example, FIG. 3 illustrates shifts in the optical signals of a temperature sensing material based on changes in the absorption characteristics at several monitored wavelengths, where the temperature sensing material is comprised of Au nanoparticles dispersed in a dielectric matrix of $SiO_2$. FIG. 3 illustrates the response when the temperature sensing material is deposited on a planar substrate and measured in a transmittance configuration, with temperatures that vary between about 500° C. to 800° C. For the results of FIG. 3, the temperature sensing material was additionally in contact with a gas having a chemical composition fixed at a mixture of about 80% $N_2$ and 20% $O_2$ by volume. The Relative Transmittance is a transmission proportional to a transmission experienced at a relative transmission of 1.0, so that a relative transmission of 1.1 indicates a 10% increase in transmission over the relative transmission of 1.1, and so on. As indicated by the associated Key at FIG. 3, the monitored wavelengths were 500 nm, 525 nm, 550 nm, 565 nm, 575 nm, and 600 nm. As indicated, the temperature sensing material generally experiences a shift in the optical signal at each specific wavelength as the temperature of the temperature sensing material increases or decreases. During the preparation of the Au/SiO2 temperature sensing material it was exposed to a temperature of 950° C. for an extended period of time to ensure that no significant particle size modifications that could cause an irreversible optical signal shift with temperature would be expected during the lower temperature experiments illustrated in FIG. 3.

Figure 4:
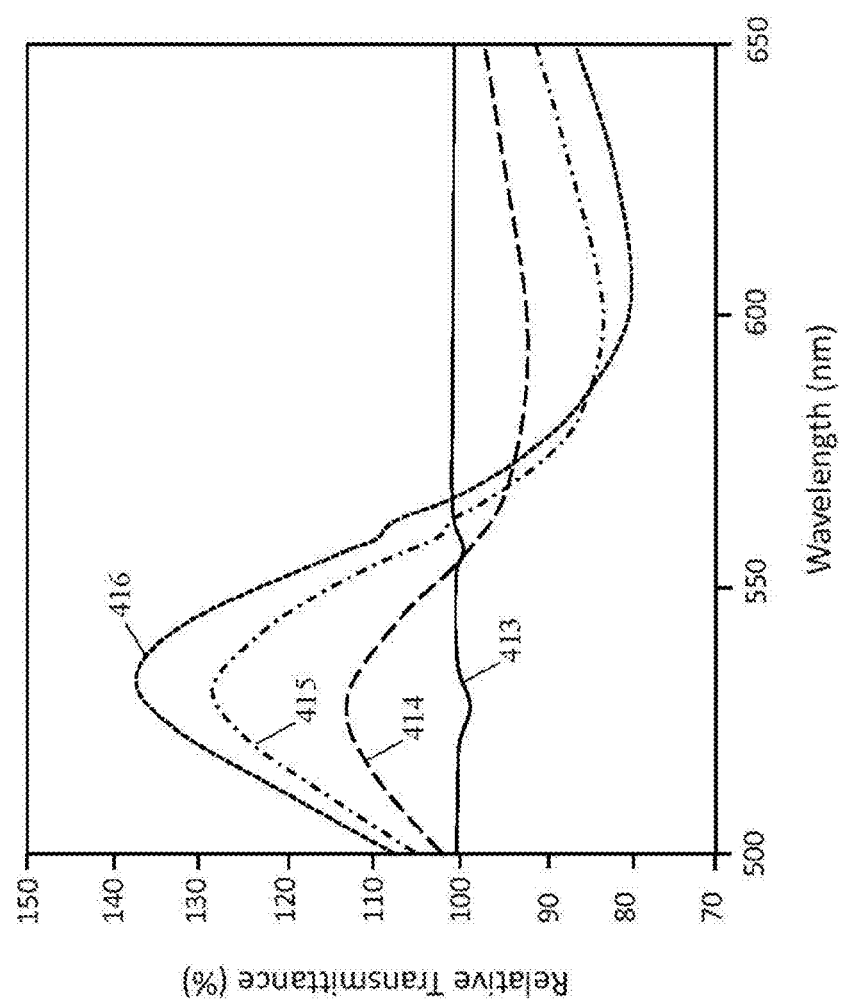
FIG. 4 illustrates the change in transmission characteristics at selected temperatures over a wavelength range for a fixed gas stream composition.
Figure 5:
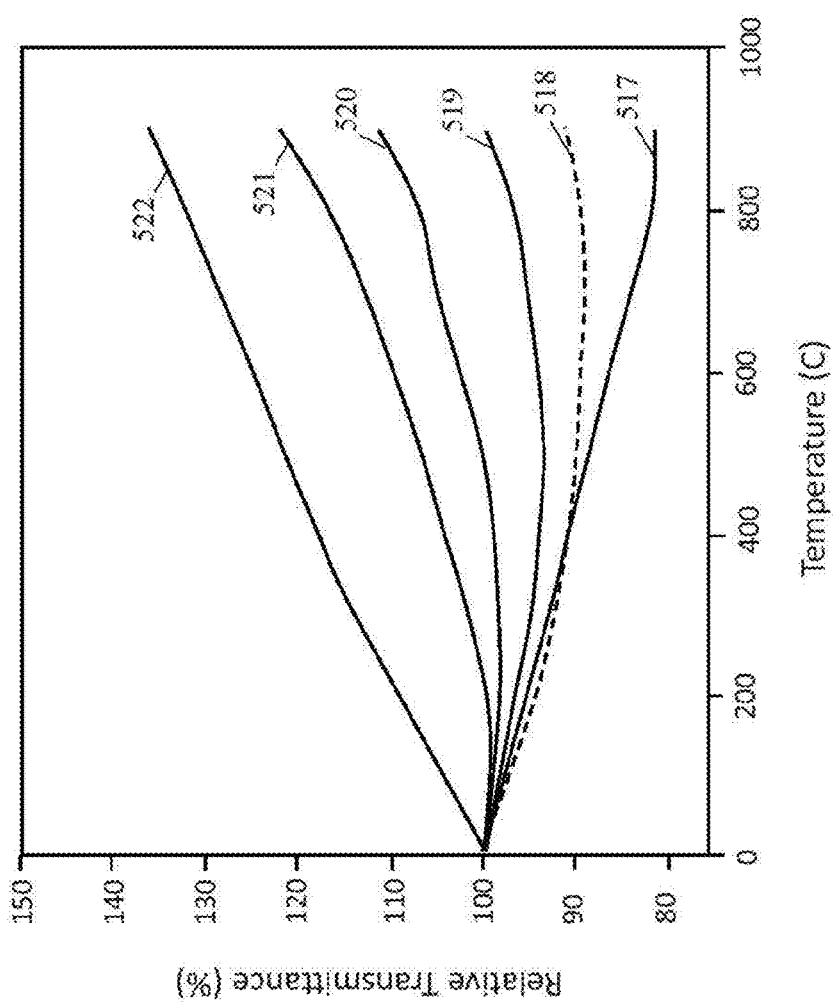
FIG. 5 illustrates the change in transmission characteristics at selected wavelengths over a temperature range for a fixed gas stream composition.

FIGS. 4 and 5 present similar results for shifts in the optical signal of an Au/SiO2 temperature sensing material in a flowing 20% $O_2$/balance $N_2$ mixture when the temperature sensing material is deposited on a fiber optic cable and illuminated by an evanescent wave, as will be discussed. At FIG. 4, the temperature sensing material response is measured in a transmittance configuration with temperatures that vary between about 20° C. to 900° C. and cover a wavelength range from about 500 nm to about 650 nm, where trace 413 represents response at about 20° C., trace 414 represents response at about 300° C., trace 415 represents response at about 700° C., and trace 416 represents response at about 900° C. Comparison of traces 413, 414, 415, and 416 clearly indicate changes in spectral transmission with temperature. At FIG. 5, relative transmissions are illustrated for the Au/SiO2 temperature sensing material deposited on the fiber optic cable, where trace 517 represents a wavelength of 600 nm, trace 518 represents a wavelength of 575 nm, trace 519 represents a wavelength of 565 nm, trace 520 represents a wavelength of 558 nm, trace 521 represents a wavelength of 550 nm, and trace 522 represents a wavelength of 525 nm over a temperature range from about 20° C. to about 900° C.

Figure 6:
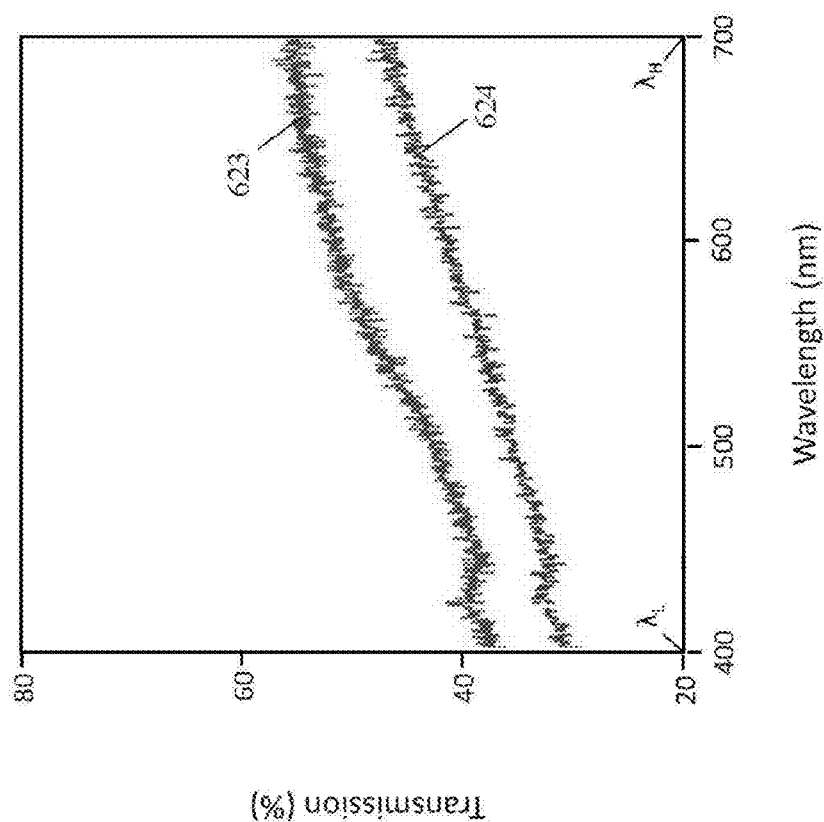
FIG. 6 illustrates the change in transmission characteristics in a second embodiment in response to temperature at specific wavelengths for a fixed gas stream composition.
Figure 7:
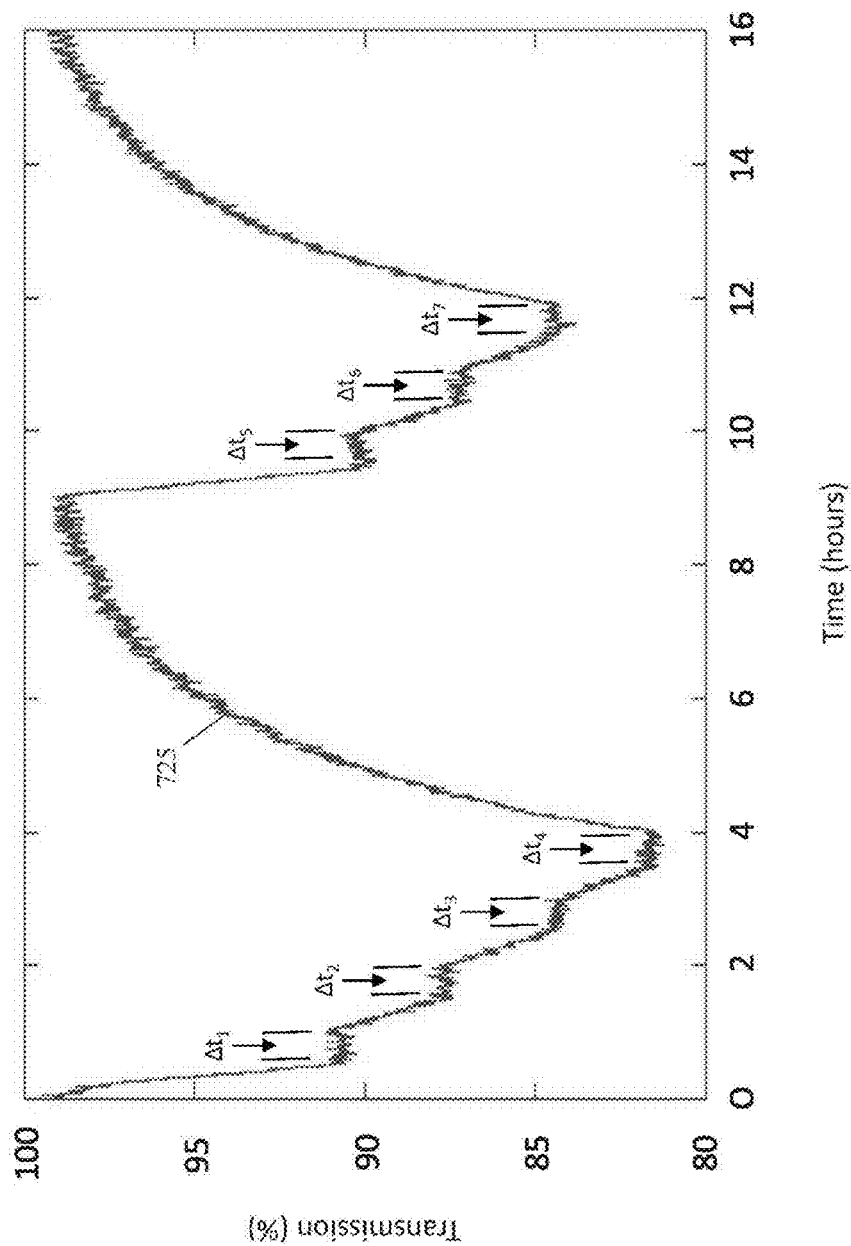
FIG. 7 illustrates the change in transmission characteristics in the second embodiment in response to temperature at a specific wavelength for a fixed gas stream composition.

As mentioned, the shift in the optical signal may be a shift at one specific wavelength or may be a shift over a monitored band of wavelengths. As an example, FIG. 6 illustrates the response of a temperature sensing material where the plurality of nanoparticles comprise Pd and the dielectric matrix is $SiO_2$, where the optical signal is monitored over a band of wavelengths bounded by a $\lambda_L$ at about 400 nm and a $\lambda_H$ at about 700 nm. Trace 623 indicates transmission between the $\lambda_L$ and the $\lambda_H$ at a room temperature of about 20° C., while Trace 624 indicates transmission between the $\lambda_L$ and the $\lambda_H$ at a temperature of about 750° C. Comparison of traces 623 and 624 clearly indicate changes in spectral transmission with temperature over the monitored band from about 400 nm to about 700 nm, and represent a shift of the optical signal over the monitored band of wavelengths, as defined herein. Similarly, FIG. 7 illustrates single wavelength transmission at 600 nm for the Pd/SiO2 temperature sensing material, where the temperature of the temperature sensing material was about 300° C. during the time increment $\Delta t_1$, about 400° C. during the time increment $\Delta t_2$, about 500° C. during the time increment $\Delta t_3$, about 600° C. during the time increment $\Delta t_4$, about 300° C. during the time increment $\Delta t_5$, about 400° C. during the time increment $\Delta t_6$, and about 500° C. during the time increment $\Delta t_7$. FIG. 7 thus represents a shift in the optical signal identified through monitoring one specific wavelength, as defined herein. During the preparation of the Pd/SiO2 temperature sensing material it was exposed to a temperature of 750° C. for an extended period of time to ensure that no significant particle size modifications that could cause an irreversible optical signal shift with temperature would be expected during the lower temperature experiments illustrated in FIG. 7.

Additionally, and as mentioned, the presence of a plasmon resonance peak within a monitored band of wavelengths is not intended to be a requirement within this method. For example, at FIG. 6, neither trace 623 or 624 indicate a plasmon resonance peak at a plasmon resonance peak position $\lambda_P$, where $\lambda_L<\lambda_P<\lambda_H$. Situations such as trace 623 and 624 are within the definition of optical signal as defined herein, and a shift noted over several wavelengths which occurs in the absence of a plasmon resonance peak shift—such as a shift from trace 623 to trace 624 and vice-versa—is within the definition of shift in the optical signal as defined herein. Correspondingly, in certain embodiments, when the optical signal "exhibits a plasmon resonance peak," this means that a plasmon resonance peak position as defined exists within the band of monitored wavelengths from a $\lambda_L$ to a $\lambda_H$. Similarly, when the optical signal "does not exhibit a plasmon resonance peak," this means that a plasmon resonance peak position as defined is not present within the band of monitored wavelengths from a $\lambda_L$ to a $\lambda_H$. For example, in certain embodiments where the plurality of nanoparticles within the temperature sensing material are comprised of Au, Ag, Al, Cu, compounds thereof, or conducting metal oxides, the optical signal may exhibit a plasmon resonance peak. In other embodiments where the plurality of nanoparticles within the temperature sensing material are comprised of Pd, Pt, Ir, Rh, Ru, Os, or compounds thereof, the optical signal may not exhibit a plasmon resonance peak.

Figure 8:
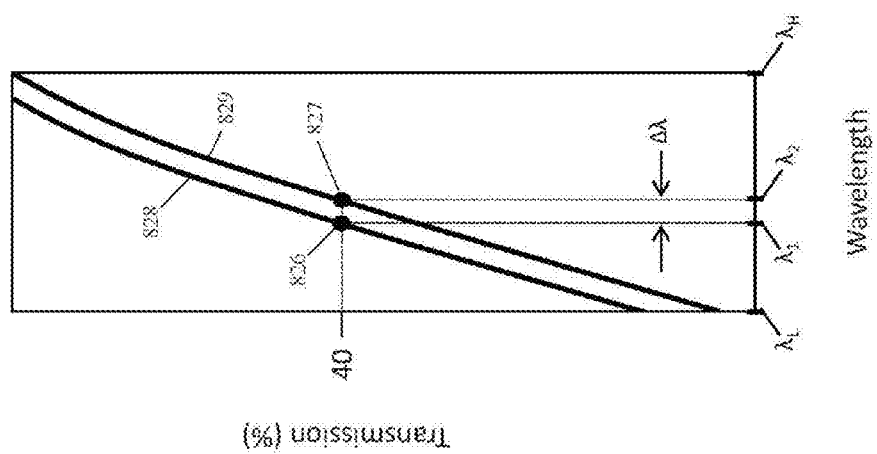
FIG. 8 illustrates a shift in an optical signal edge for a specific embodiment.

Within this disclosure, the optical signal may be described as an optical signal edge. An "optical signal edge" when specified as present within a described wave length range means a specific wavelength where a specified percentage of the incident light is transmitted through the temperature sensing material. For example, at FIG. 8, points 826 and 827 on traces 828 and 829 respectively, indicating a transmission percentage of about 40% on the respective traces within a wavelength range from a $\lambda_L$ to a $\lambda_H$. Similarly, a "shift in the optical signal edge" means a wavelength difference between a first wavelength and a second wavelength, where the specified percentage of the incident light is transmitted, absorbed, reflected, or scattered through the temperature sensing material at both the first wavelength and the second wavelength. For example, at FIG. 8, a shift in the optical signal edge $\Delta\lambda$ which occurs at the specified percentage of about 40% at FIG. 8 between the first wavelength $\lambda_1$ and the second wavelength $\lambda_2$. However, within this disclosure, an optical signal edge may be defined using any percentage as the specified percentage and any range as the described wave length range.

The temperature response of the temperature sensing material described and the method disclosed may be utilized to provide indications of a temperature change in a mass such as a fluid (gas or liquid) or solid, when the mass is in thermal communication with the temperature sensing material. Here, thermal communication means the temperature sensing material and the mass have a physical relationship whereby heat transfers between the temperature sensing material and the mass when the temperature sensing material and the mass have differing temperatures. For example, the mass may be a liquid, gas, or solid in contact with the temperature sensing material.

As stated, the temperature sensing material of this disclosure is comprised of a plurality of metallic nanoparticles dispersed in a dielectric matrix, where the metallic nanoparticles are individually comprised of a metallic. Preferably, an individual nanoparticle is comprised of at least 50 weight percent (wt %) of the metallic, and more preferably, at least 90 wt % of the metallic. Here "metallic" means one or more metals or any material comprised of one or more metals, to include but not limited to compounds such as oxides comprised of one or more metals. Here, "metal" means any element represented on the Periodic Table of Elements with the exception of H, C, N, P, O, S, Se, and elements within groups 17 and 18. In an embodiment, the metallic is comprised of metals well-known to display a plasmon resonance when embedded in common dielectric matrix materials such as Au, Ag, Al, and Cu or alloys or compounds thereof. In another embodiment, the metallic is comprised of metals commonly referred to as noble or precious metals which tend to exhibit improved resistance to corrosion, reduced reactivity, and relatively high melting points such as Ag, Ag, Pd, Pt, Ir, Rh, Ru, Os, or alloys or compounds thereof. Additionally, the plurality of metallic nanoparticles has an average nanoparticle diameter of less than about 500 nanometers. The average nanoparticle diameter may be determined using various methods known in the art for the sizing of nanoparticles, for example, scanning electron microscopy (SEM), atomic force microscopy (AFM), and transmission electron microscopy (TEM) methods. Preferably, the average particle size is determined through image analysis by capturing a sample of typically at least 100 nanoparticles, more preferably at least 300 nanoparticles. However, the method by which an average nanoparticle diameter is determined is not limiting within this method. Within this method, it is only necessary that the metallic nanoparticles are individually comprised of a metal, and that the plurality of metallic nanoparticles has an average nanoparticle diameter of less than about 500 nanometers. In an embodiment, the average nanoparticle diameter is less than about 100 nanometers. In some embodiments, the average size of the metallic nanoparticles may be tailored in order to derive a desired temperature sensing response. For example, relatively large particles approaching 100 nm in diameter are expected to strongly scatter light in the visible range while relatively small particles less than approximately 10-20 nm are not. Tailoring the particle size can therefore affect the wavelength and temperature dependent optical response of a metallic nanoparticle extinction, absorption, and scattering cross-section. Tailoring of particle size may also be important for optimizing additional aspects such as the temperature stability of the nanocomposite film structure as well as the type, degree, and kinetics of a chemical sensing response of the material. In an embodiment, the average nanoparticle diameter is greater than about 2 nm.

As discussed, in certain embodiments, the metallic nanoparticles are individually comprised of a conducting metal oxide. Here "conducting metal oxide" means a compound having the empirical formula $M_aO_b$ where M is at least a first element and O is an oxygen anion. In certain embodiments, the conducting metal oxide is a material having a carrier concentration of at least $10^{17}/cm^3$, a bandgap of at least 2 eV, and an electronic conductivity of at least $10^{-1}$ S/cm at the temperature of the temperature sensing material. The carrier concentration of the conducting metal oxide is preferably at least $10^{18}/cm^3$, more preferably at least $10^{19}/cm^3$. The electronic conductivity is preferably at least $10^0$ S/cm, more preferably at least $10^1$ S/cm, and most preferably at least $10^2$ S/cm. In other embodiments, the conducting metal oxide thus has the general properties associated with that group of materials known generically as transparent conducting oxides. In a further embodiment, the conducting metal oxide has the empirical formula $A_{(1-x)}B_xO_z$. Exemplary conducting metal oxides include but are not limited to AZO ($Zn_{1-x}Al_xO$), ITO ($In_{2-x}Sn_xO_3$), Nb-doped $TiO_2$ ($Ti_{1-x}Nb_xO_2$), and F-doped $SnO_2$.

It is understood that the nanoparticles of this disclosure are not limited to strictly spherical shapes, and that the plurality of metallic nanoparticles may be comprised of shapes such as triangular prisms, disks, shells, wires, rods, and others. When such structures are present, the average particle diameter refers and is equivalent to an equivalent circular diameter (ECD), which connotes the diameter of a circle with area equal to that of the projection of the particle on a plane. See e.g., Xu et al, "Comparison of sizing small particles using different technologies," *Powder Technology* 132 (2003). However, in the case of high temperatures greater than approximately 500° C. spherical shapes are often preferred due to an improved high temperature stability as compared to other shapes such as rods and disks. In other cases, anistropic shapes such as rods may allow for unique functionality or improved sensitivity to temperature.

As discussed, where the dielectric matrix has an electronic conductivity at least two orders of magnitude less than the metallic nanoparticles at the temperature of the temperature sensing material, and individual metallic nanoparticles within the plurality of nanoparticles have an electronic conductivity of greater than $10^{-1}$ S/cm at the temperature of the temperature sensing material. Electronic conductivity at the temperature of the temperature sensing material may be determined using any means known in the art. See, e.g., R. Bartnikas, *Electrical Properties of Solid Insulating Materials: Measurement Techniques,* Engineering Dielectrics Volume IIB (1987), among others. Direct measurements of electrical conductivity of the metallic nanoparticles in a temperature sensing material can be complicated due to a lack of electrical continuity between dispersed metallic nanoparticles. One method for determining the electrical conductivity of either the metallic particles or the matrix involves determining the electrical conductivity of a continuous film of substantially the same nominal composition and density as the metallic nanoparticles or the matrix using any means known in the art. As one example, the electrical conductivity of Au nanoparticles to be utilized in, for example, a Au/TiO2 temperature sensing material may be determined by depositing a Au film of approximately 100 nm in thickness through standard sputter deposition techniques onto a glass substrate. The electrical conductivity of the Au at the temperature of the temperature sensing material can then be determined through standard techniques known in the art. In some cases, a continuous film may not be stable at the temperature of the temperature sensing material due to improved stability of metallic nanoparticles dispersed in the temperature sensing material. Extrapolation of the conductivity from lower temperatures to the higher temperature of interest can then be employed using standard techniques known in the art. See e.g. S. Reif-Acherman, "Studies on the temperature dependence of electric conductivity for metals in the Nineteenth Century: a neglected chapter in the history of superconductivity", Revista Brasileira de Ensino de Fisica 33 (4) (2011); see also L. Berger, *Semiconductor Materials,* 1997. An alternate method for determining electrical conductivity might be through optical spectroscopy or AC conductivity measurements in conjunction with commonly known approaches for obtaining DC conductivity from AC conductivities. Such techniques can also be used for determining AC conductivity for composite materials and for the constituent phases through application of optical modeling techniques known in the art. For example, optical spectroscopy could be employed to determine the optical constants of a Au/TiO$_2$ temperature sensing material which can then be modeled using effective medium approximations in conjunction with standard optical models to determine the conductivity of the Au nanoparticles. See e.g. C. Tsonos, "AC and DC conductivity correlation: the coefficient of Barton-Nakajima-Namikawa relation", Journal of Non-Crystalline Solids 358 (2012); see also J. Lloyd-Hughes, "A review of the terahertz conductivity of bulk and nano-materials", Journal of Infrared, Millimetre and Terahertz Waves 33 (9) (2012); see also H. Su, "Optical and electrical properties of Au nanoparticles in two-dimensional networks: an effective cluster model", Optics Express (17) (2009). It is understood that the above methods of determining electronic conductivity are intended to be exemplary only, and are not intended as limitations within this disclosure. Any methods known in the art for determining the electronic conductivity of the materials as described herein may be utilized. Within this disclosure, it is only necessary that individual metallic nanoparticles within the plurality of nanoparticles have an electronic conductivity of greater than $10^{-1}$ S/cm at the temperature of the temperature sensing material, and that the dielectric matrix have an electronic conductivity at least two orders of magnitude less than the metallic nanoparticles at the temperature of the temperature sensing material, regardless of how those respective electronic conductivities may be determined.

Within the temperature sensing material, the metallic nanoparticles are dispersed in the dielectric matrix. As used herein, "dispersed" means that individual metallic nanoparticles comprising the plurality of metallic nanoparticles in the temperature sensing material are sufficiently separated such that the temperature sensing material displays an electrical conductance at least an order of magnitude less than the electrical conductance of the bulk metallic under an equivalent temperature condition, such that the electrical conductance is less than $\frac{1}{10}^{th}$ of the electrical conductance of the bulk metallic. Such a condition can be determined using various methods for the evaluation of proximity to a percolation limit in supported nanoparticle systems. See e.g. Trudeau et al., "Competitive transport and percolation in disordered arrays of molecularly linked Au nanoparticles," *J. Chem. Phys.,* Vol. 117 (2002), among others. Additionally, in an embodiment, an average spacing between individual metallic nanoparticles is at least five times greater than the average nanoparticle diameter, where average spacing indicates the average displacement between a metallic nanoparticle and a nearest metallic nanoparticle neighbor. For a given metallic nanoparticle, the nearest metallic nanoparticle neighbor may be determined through a variety of statistical methods known in the art, such as fixed radius analysis, minimal spanning trees, Voronoi polygons, k-nearest neighbor algorithms, and other established nearest neighbor methodologies. See e.g., Dussert et al., "Minimal spanning tree: A new approach for studying order and disorder," *Phys. Rev. B,* 34 (5) (1986), and see Aurenhammer, "Voronoi Diagrams—A Survey of a Fundamental Geometric Data Structure," *ACM Comput. Surv.,* 23(3) (1991), and see Cover et al., "Nearest Neighbor Pattern Classification," *IEEE T. Inform. Theory* 13(1) (1967), among others. The displacement between the given metallic nanoparticle and the nearest metallic nanoparticle neighbor may be determined using techniques such as scanning electron microscopy, atomic force microscopy, and transmission electron microscopy, and the average spacing may be determined as the average value over some statistically significant population of metallic nanoparticles, for example at least 100 metallic nanoparticles.

Figure 15:
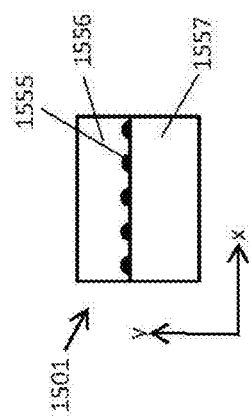
FIG. 15 illustrates a further embodiment of the temperature sensing material.
Figure 14:
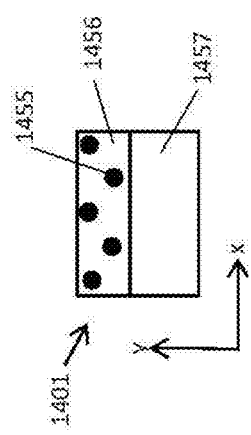
FIG. 14 illustrates another embodiment of the temperature sensing material.
Figure 13:
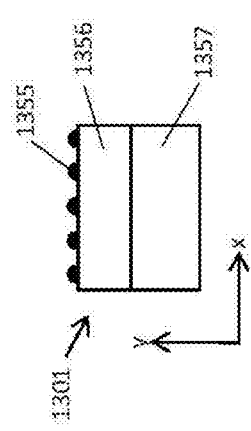
FIG. 13 illustrates an embodiment of the temperature sensing material.

The metallic nanoparticles may be dispersed relatively uniformly or non-uniformly with respect to the dielectric matrix, provided that the nanoparticles are dispersed within the meaning of the definition discussed above. For example, FIG. 13 illustrates a temperature sensing material 1301 comprised of a plurality of metallic nanoparticles such as metallic nanoparticle 1355 and a dielectric matrix 1356, and where temperature sensing material 1301 is further in contact with a substrate 1357. At FIG. 13, the plurality of metallic nanoparticles are concentrated such that the relative concentration of metallic nanoparticles decreases or disappears within dielectric matrix 1356 as displacement occurs in a negative direction of the y-axis illustrated. Similarly, FIG. 14 illustrates temperature sensing material 1401 comprised of a plurality of metallic nanoparticles such as metallic nanoparticle 1455 and dielectric matrix 1456, and where temperature sensing material 1401 is further in contact with a substrate 1457. In contrast to FIG. 13, at FIG. 14 the plurality of metallic nanoparticles are distributed relatively homogenously through dielectric matrix 1456, such that the relative concentration of metallic nanoparticles is substantially similar within dielectric matrix 1456 as displacement occurs in a negative direction of the y-axis illustrated. Additionally, FIG. 15 illustrates temperature sensing material 1501 comprised of a plurality of metallic nanoparticles such as metallic nanoparticle 1555 and dielectric matrix 1556, and where temperature sensing material 1501 is further in contact with substrate 1557, and depicts the plurality of metallic nanoparticles concentrated in a region of dielectric matrix 1556 such that the relative concentration of metallic nanoparticles increases within dielectric matrix 1556 as displacement occurs in a negative direction of the y-axis illustrated, and decreases or disappears as displacement occurs in a positive direction of the y-axis illustrated. However, arrangements such as those in FIGS. 13, 14, and 15 are exemplary only, and the relative concentrations of metallic nanoparticles in varying regions of the dielectric matrix are not limiting within this disclosure. Within this disclosure, it is only necessary that the metallic nanoparticles are sufficiently separated such that the temperature sensing material displays an electrical conductance at least an order of magnitude less than the electrical conductance of the bulk metallic under an equivalent temperature condition, as discussed above.

The dielectric matrix supporting the plurality of metallic nanoparticles is permeable at least to some degree to the incident light at wavelengths corresponding to the optical signal. For example, when the optical signal comprises a light wavelength range from about 350 nm to about 800 nm, the dielectric matrix is permeable at least to some degree to the incident light at wavelengths from about 350 nm to about 800 nm. In an embodiment, the dielectric matrix is permeable at least to some degree to light at wavelengths over the visible spectrum. Here "visible spectrum" connotes light having wavelengths from about 400 nm to about 750 nm. In another embodiment, the dielectric matrix is permeable at least to some degree to light at wavelengths over the near-infrared spectrum. Here "near-infrared spectrum" connotes light having wavelengths from about 750 nm to 3000 nm.

In an embodiment, the dielectric matrix is an oxide having the empirical formula $M_aO_b$ where M is at least a first element and O is an oxygen anion. In another embodiment, the oxide has a carrier concentration of less than $10^{17}/cm^3$, a bandgap of at least 2 eV, and an electronic conductivity of less than $10^{-1}$ S/cm at the temperature where the shift in the optical signal occurs. In a further embodiment, M is at least a first element and a second element and the dielectric matrix has the empirical formula $A_yB_xO_z$, where A is the first element, B is the second element, and O is an oxygen anion. In a further embodiment, the first element, the second element, and the oxygen anion form a crystalline structure having a lattice system such as cubic, hexagonal, tetragonal, rhombohedral, orthorhombic, monoclinic, or triclinic, and M and the oxygen anion are located at special positions within the lattice. See e.g., J. N. Lalena et al., *Principles of Inorganic Material Design* ($2^{nd}$ Ed., 2010). In another embodiment, the second element is a cation or an anion within the crystalline structure of the oxide.

In an additional embodiment, the dielectric matrix is a nitride having the empirical formula $M_aN_b$ where M is at least a first element and N is a nitrogen anion. In a further embodiment the nitride is an oxynitride having the empirical formula $M_yO_xN_z$, where M is at least a first element, O is oxygen, and N is a nitrogen anion. Exemplary nitrides include but are not limited to silicon nitride ($Si_3N_4$), silicon oxynitride ($SiO_xN_y$), and aluminum oxynitride (AlON), among others.

In another embodiment, the temperature sensing material is illuminated by a wave propagating along a waveguide, such as a fiber optic cable. This particular embodiment is illustrated at FIG. 16. The waveguide is comprised of a core material 1664 in contact with a cladding material 1665, where core material 1664 has a refractive index greater than cladding material 1665. For example, core material 1664 and cladding material 1665 may be comprised of silica and various additions such as germanium, titanium, phosphorous, boron, fluorine, or other dopants in order to alter the respective refractive indices and meet the necessary criteria. At FIG. 16 light source 1662 emits light into core material 1664, generating wave 1666 penetrating cladding material 1665. At FIG. 16, temperature sensing material 1601 having the properties disclosed is placed in contact with core material 1664 such that temperature sensing material 1601 is illuminated by wave 1666 as illustrated. Exiting light 1667 is collected by probe 1668. Illumination of temperature sensing material 1601 by wave 1666 enables detecting a change in temperature by detecting a shift in the optical signal, as earlier described. In an embodiment, temperature sensing material 1601 is in thermal communication with a second mass (gas, liquid, or solid) such as fluid stream G and a shift in the optical signal generated through illumination by wave 1666 serves as an indication of a change in the temperature of fluid stream G, as earlier described. The optical power and penetration depth of the evanescent wave into cladding 1665 and temperature sensing material 1601 can be described by Beer-Lambert law. See e.g., Dickinson et al., "Convergent, Self-Encoded Bead Sensor Arrays in the design of an Artificial Nose," *Anal. Chem.* 71 (1999), among others. As is similarly understood, the optical power coupled into the evanescent field may be improved by various methods such as bending, optimizing the relative refractive indices of the core and cladding, use of hollow fibers, and other methods. See e.g., Elosua et al., "Volatile Organic Compound Optical Fiber Sensors: A Review," *Sensors* 6 (2006), among others.

Figure 12:
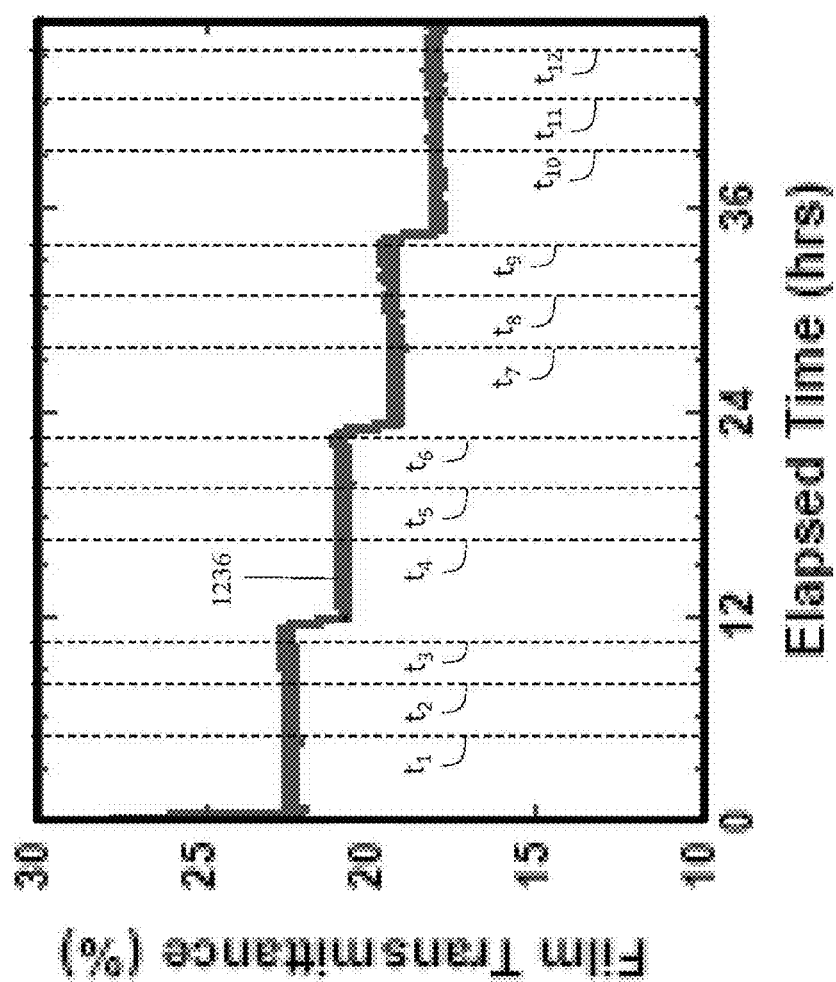
FIG. 12 the change in transmission characteristics in response to temperature and composition changes at a single specific wavelength.
Figure 17:
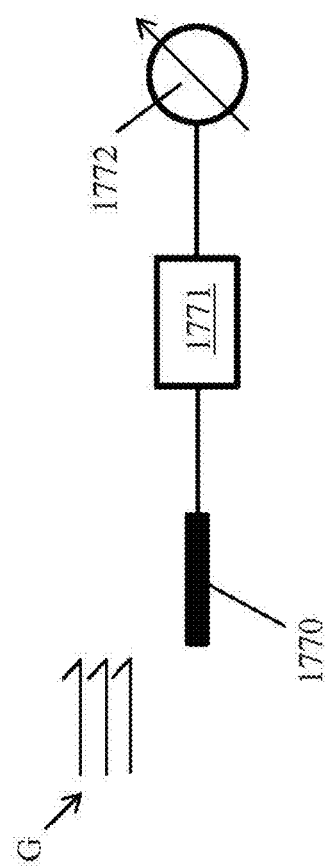
FIG. 17 illustrates an embodiment of a temperature sensing instrument.

In another embodiment, the response of the temperature sensing material displayed in response to a change in temperature is utilized in an instrument to specifically determine the temperature of the temperature sensing material. In this embodiment, the temperature sensing material comprises a sensing head in a sensing instrument, where the sensing head communicates with an interrogator and a metered response is provided. The methodology is represented at FIG. 17. At FIG. 17, sensing head 1770 is comprised of a temperature sensing material as described herein, and interrogator 1771 illuminates the temperature sensing material comprising sensing head 1770 with incident light and gathers exiting light. Interrogator 1771 compares the incident light and the exiting light and generates a measurand, where the measurand is proportional to a shift in the optical signal as defined herein. Such interrogators for use in optical systems are known the art. See e.g., Lee et al., "Review of the present status of optical fiber sensors," *Optical Fiber Technology* 9 (2003), and associated references. Interrogator 1771 is in data communication with meter 1772 which provides an indication of the magnitude of the measurand generated and communicated by interrogator 1771. A monotonic response of the temperature sensing material to increasing or decreasing temperatures allows the measurand generated by interrogator 1771 and interpreted for display by meter 1772 to provide an indication of the temperature of the temperature sensing material. For example, utilizing the method illustrated at FIG. 17 for a temperature sensing material experiencing the temperature conditions discussed for optical signal 1236 at FIG. 12, a measurand generated by interrogator 1771 between times $t_1$ to $t_3$, when the temperature of the temperature sensing material is about 400° C., would have an absolute magnitude greater than a measurand generated by interrogator 1671 between times $t_4$ to $t_6$, when the temperature of the temperature sensing material is about 500° C. Correspondingly, the display provided by meter 1772 and noted for time $t_1$-$t_3$ versus time $t_4$-$t_6$ would serve as an indication of the differing magnitudes of the respective measurands. In this embodiment, the steps of illuminating the temperature sensing material, collecting exiting light, and monitoring an optical signal based on a comparison of the incident light and the exiting light is conducted by interrogator 1771, and detecting a shift in the optical signal is conducted through observation of meter 1772. An indication of the temperature of the temperature sensing material is provided by comparison of the observed meter reading and is reference meter reading, where the reference meter reading results from a reference measurand generated under reference conditions, for example when the temperature of the temperature sensing material is 600° C., or some other temperature of the temperature sensing material. Such as instrument can additionally be used to provide an indications of a second temperature of a second mass such as a fluid (gas or liquid) or solid when the second mass is in thermal communication with the temperature sensing material. For example, using a similar methodology, the instrument could be utilized to provide an indication of the temperature of fluid stream G.

Figure 19:
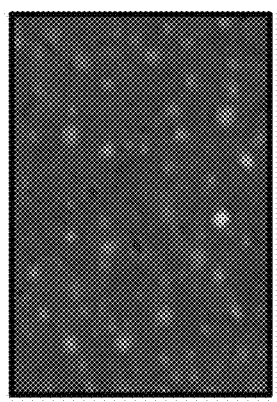
FIG. 19 shows the Au/$TiO_2$ temperature sensing material following high temperature exposure to a $H_2S$ contaminated fuel gas stream.
Figure 21:
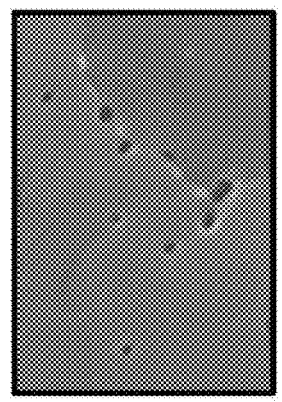
FIG. 21 shows the $TiO_2$ film following high temperature exposure to a $H_2S$ contaminated fuel gas stream.
Figure 18:
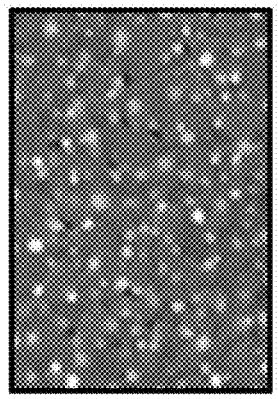
FIG. 18 shows a Au/$TiO_2$ temperature sensing material prior to high temperature exposure to a $H_2S$ contaminated fuel gas stream.
Figure 20:
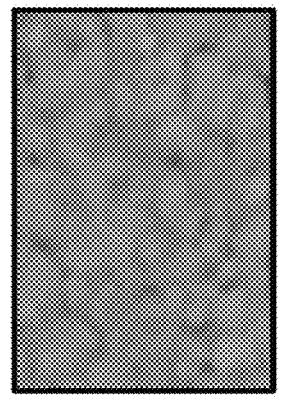
FIG. 20 shows a $TiO_2$ film prior to high temperature exposure to a $H_2S$ contaminated fuel gas stream.

An additional advantage of the methodology disclosed herein is the use of temperature sensing materials which exhibit improved temperature stability, chemical stability, and/or additional functionality as compared to continuous films of a dielectric material such as ZnO or $TiO_2$, or continuous films of a metal displaying a surface plasmon resonance such as Ag or Au. In certain embodiments, incorporation of metallic particles into a dielectric matrix can improve stability under high temperature exposures. As illustration, FIGS. 18 and 19 depict an Au/TiO2 temperature sensing material, where FIG. 18 depicts the temperature sensing material prior to exposure to an $H_2S$ contaminated fuel gas stream at a temperature of 800° C. for a period of approximately 1 week and FIG. 19 depicts the temperature sensing material following exposure to the $H_2S$ contaminated fuel gas stream under the specified conditions. In contrast, FIGS. 20 and 21 depict an TiO2 material with an absence of metallic nanoparticles, where FIG. 20 depicts the temperature sensing material prior to exposure to an $H_2S$ contaminated fuel gas stream and FIG. 21 depicts the temperature sensing material following exposure to the $H_2S$ contaminated fuel gas stream under the specified conditions. A comparison of FIGS. 18 and 19 illustrates that the $TiO_2$ matrix of the Au/$TiO_2$ temperature sensing material has an average grain size that is comparable before and after the exposure. In contrast, a comparison of FIGS. 20 and 21 illustrates that the $TiO_2$ material with an absence of metallic nanoparticles has undergone massive grain coarsening and a phase transformation from anatase to rutile. The nanocomposite film temperature sensor material composed of Au/$TiO_2$ therefore exhibits higher temperature stability as compared to $TiO_2$ material without Au particles under the high temperature and corrosive atmosphere conditions of this treatment.

In a particular embodiment, the temperature sensing material is placed in contact with a liquid or gas fluid having a chemical composition, and the temperature sensing material is additionally utilized to determine changes in the chemical composition of the fluid. In this embodiment, the temperature sensing material is illuminated and the optical signal is monitored in order to detect changes in temperature as before, and in addition, a second optical signal is monitored based on the comparison of the incident light and the exiting light, and the chemical composition is detected based on a shift in the second optical signal. Here, "second optical signal" and "shift in the second optical signal" are defined in the same manner as "optical signal" and "shift in the optical signal" above. Monitoring both the optical signal and a second optical signal enables simultaneous gas and temperature sensing using a single element comprised of the single temperature sensing material as described herein.

Figure 9:
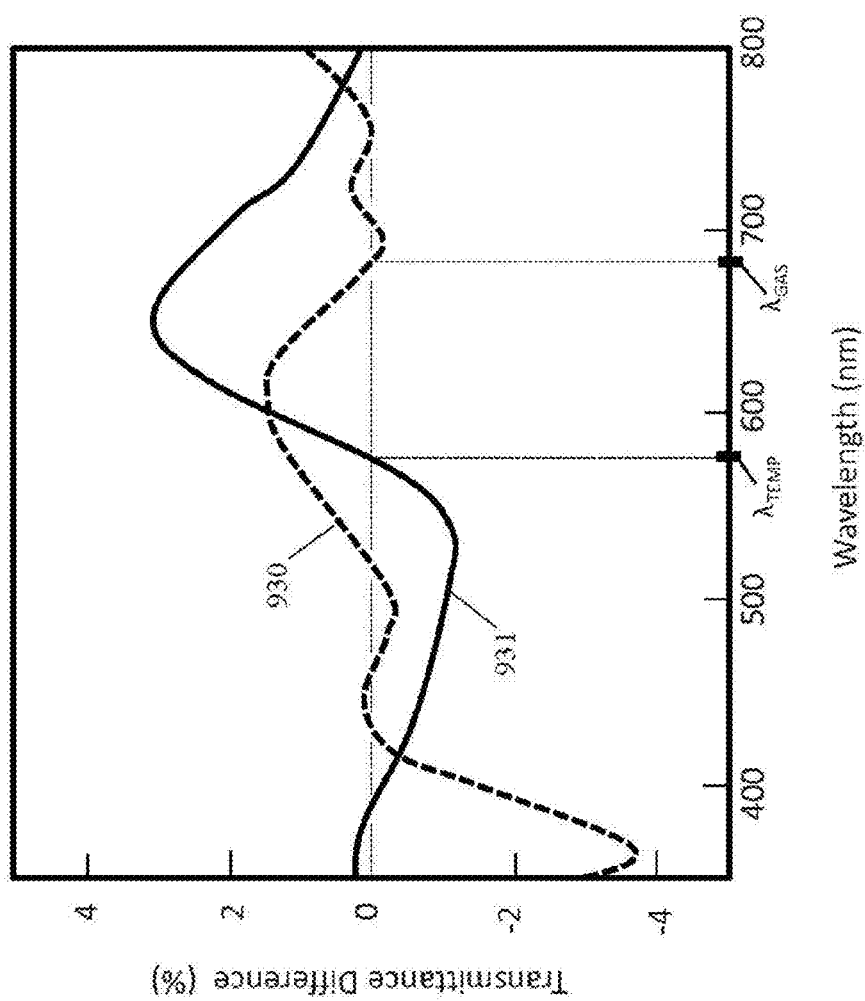
FIG. 9 illustrates a change in transmittance difference in response to a changing temperature and gas composition.

The ability of a temperature sensing material to provide simultaneous temperature and chemical sensing through monitoring of both the optical signal and a second optical signal is illustrated with reference to FIG. 9, illustrating the response of a temperature sensing material where the plurality of nanoparticles comprise Au and the dielectric matrix is $SiO_2$. At FIG. 9, trace 930 indicates the shift in an optical signal as a change in transmission (Transmittance Difference) over a band of wavelengths which results when the temperature of the Au/$SiO_2$ temperature sensing material is changed from about 400° C. to about 600° C., while the Au/$SiO_2$ material is exposed to a 20% $O_2$/balance $N_2$ atmosphere. In contrast, at FIG. 9, trace 931 indicates the shift in a second optical signal as a change in transmission at a given wavelength which results when the atmosphere contacting the Au/$SiO_2$ material is changed from a 20% $O_2$/balance $N_2$ atmosphere to a 4% $H_2$/balance $N_2$ atmosphere, while the temperature of the Au/$SiO_2$ material is maintained at about 600° C. A comparison of traces 930 and 931 illustrates that monitoring for a "shift in the optical signal" due to a change in temperature such as that indicated by trace 930 while simultaneously monitoring for a "shift in the second optical signal" due to a change in composition such as that indicated by trace 931 can allow for simultaneous chemical composition and temperature sensing of a gas stream using a single element comprised of the single temperature sensing material, because of the unique wavelength dependences of the optical signal shifts due to each parameter. The shifts in the optical signal and the second optical signal may be recognized by detecting a variation at any monitored wavelength or by variations at multiple wavelengths over a band of wavelengths, as before.

As an example, at FIG. 9, an optical signal might be defined as either $\lambda_{TEMP}$ or some band of wavelengths that includes $\lambda_{TEMP}$, and a shift in the optical signal might be defined by a variation in the neighborhood of or at the wavelength $\lambda_{TEMP}$, where variations due to a changing temperature (trace 930) are expected to have a greater effect on transmittance than variations in composition (trace 931). Similarly, a second optical signal might be defined as either $\lambda_{GAS}$ or some band of wavelengths that includes $\lambda_{GAS}$, and a shift in a second optical signal might be defined by a variation in the neighborhood of or at the wavelength $\lambda_{GAS}$, where variations due to a changing composition (trace 931) are expected to have a greater effect on transmittance than variations in temperature (trace 930). Under such definitions, shifts in the optical signal indicated by variations at or around the wavelength $\lambda_{TEMP}$ could serve to indicate changes in temperature, while shifts in the second optical signal indicated by variations at or around the wavelength $\lambda_{GAS}$ could serve to indicate changes in composition, such that simultaneous temperature and composition sensing can be accomplished.

It is understood that when this disclosure describes an "optical signal" and a "second optical signal," where the optical signal is a comparison of light incident on the temperature sensing material and light exiting the temperature sensing material over a first plurality of wavelengths, and where the second optical signal is a comparison of light incident on the temperature sensing material and light exiting the temperature sensing material over a second plurality of wavelengths, the first plurality and the second plurality may have some wavelengths in common, may have no wavelengths in common, or may have all wavelengths in common. Stated differently, if the first plurality is a first set of wavelengths and the second plurality is a second set of wavelengths, than the first set may intersect the second set, or the first set and the second set may be disjoint, or the first set may be equal to the second set. See e.g. T. J. Jech, *Set Theory* (1978), among others. In another embodiment, the optical signal includes one or more wavelengths and includes at least a wavelength designated as a $\lambda_{TEMP}$ and the second optical signal includes one or more wavelengths and includes at least a wavelength designated as a $\lambda_{GAS}$, and the $\lambda_{TEMP}$ is not equal to the $\lambda_{GAS}$. Additionally, it is understood that monitoring the first optical signal and monitoring the second optical signal may occur simultaneously. Further, it is understood that when the first set of wavelengths is equal to the second set of wavelengths, monitoring the optical signal and monitoring the second optical signal may be conducted with a single observation.

Figure 10:
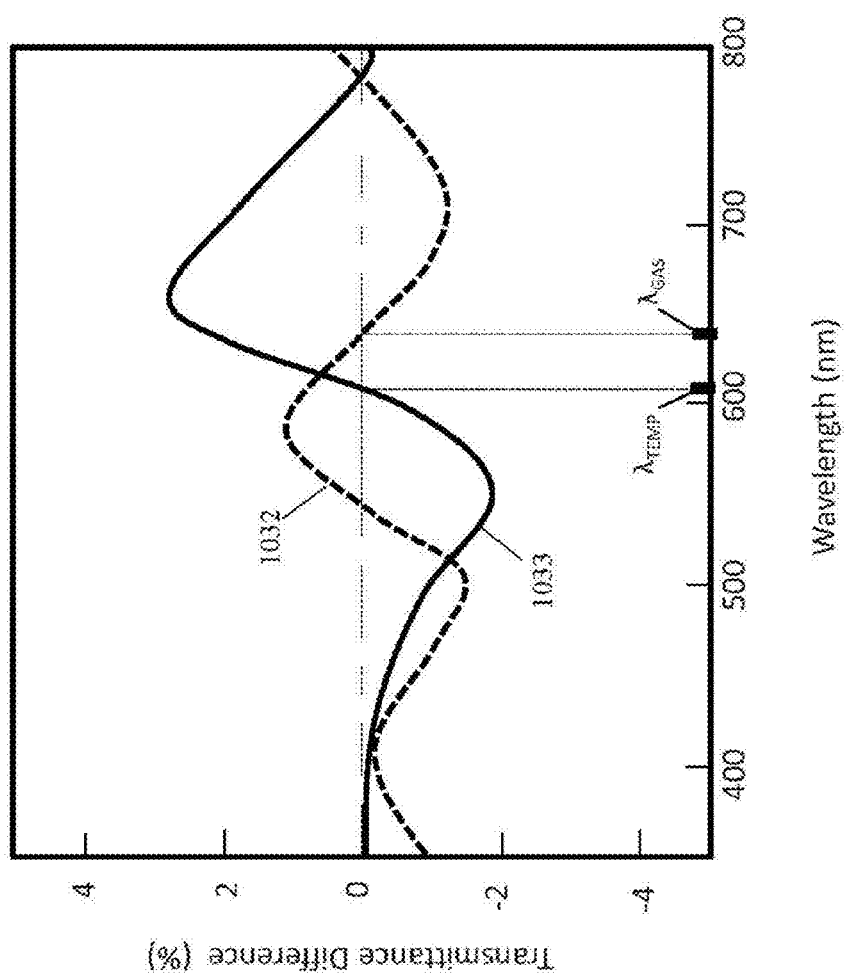
FIG. 10 illustrates a change in transmittance difference in another embodiment in response to a changing temperature and gas composition.

A further example is illustrated at FIG. 10 for a temperature sensing material where the plurality of nanoparticles comprise Au and the dielectric matrix is $ZrO_2$. At FIG. 10, trace 1032 indicates the change in transmission when the temperature of the Au/$ZrO_2$ material is changed from about 400° C. to about 600° C. in a 20% $O_2$/balance $N_2$ atmosphere, while trace 1033 indicates the change in transmission when the atmosphere is changed from a 20% $O_2$/balance $N_2$ to a 4% $H_2$/balance $N_2$, while the temperature is maintained at about 600° C. Similar to FIG. 9, a shift in the optical signal indicated by variations at or around a wavelength $\lambda_{TEMP}$ could serve to indicate changes in temperature while shifts in a second optical signal indicated by variations at or around a wavelength $\lambda_{GAS}$ could serve to indicate changes in composition, such that simultaneous temperature and composition sensing can be accomplished.

In some cases, optical signals may be further processed in order to more accurately extract information of interest with reduced cross-correlation. As just one example, at FIG. 10 it can be observed that trace 1033 is largely linear and spans positive and negative values over a limited wavelength range of +/−25 nm centered around $\lambda_{GAS}$. In contrast, trace 1033 is largely positive in value over the same wavelength range. As such, by integrating the measured optical signal over the corresponding wavelength range one could derive a new signal that is substantially associated with a chemical sensing response and with reduced cross-correlation to temperature. Similarly, other standard signal processing approaches could be employed to obtain a new signal which includes derivatives at a single wavelength, a difference between two signals at a single wavelength or over a broad range of wavelengths, the multiplication of two signals at a single wavelength or over a broad range of wavelengths, convolution of two signals, a fourier transformation of a signal, and others.

Figure 11:
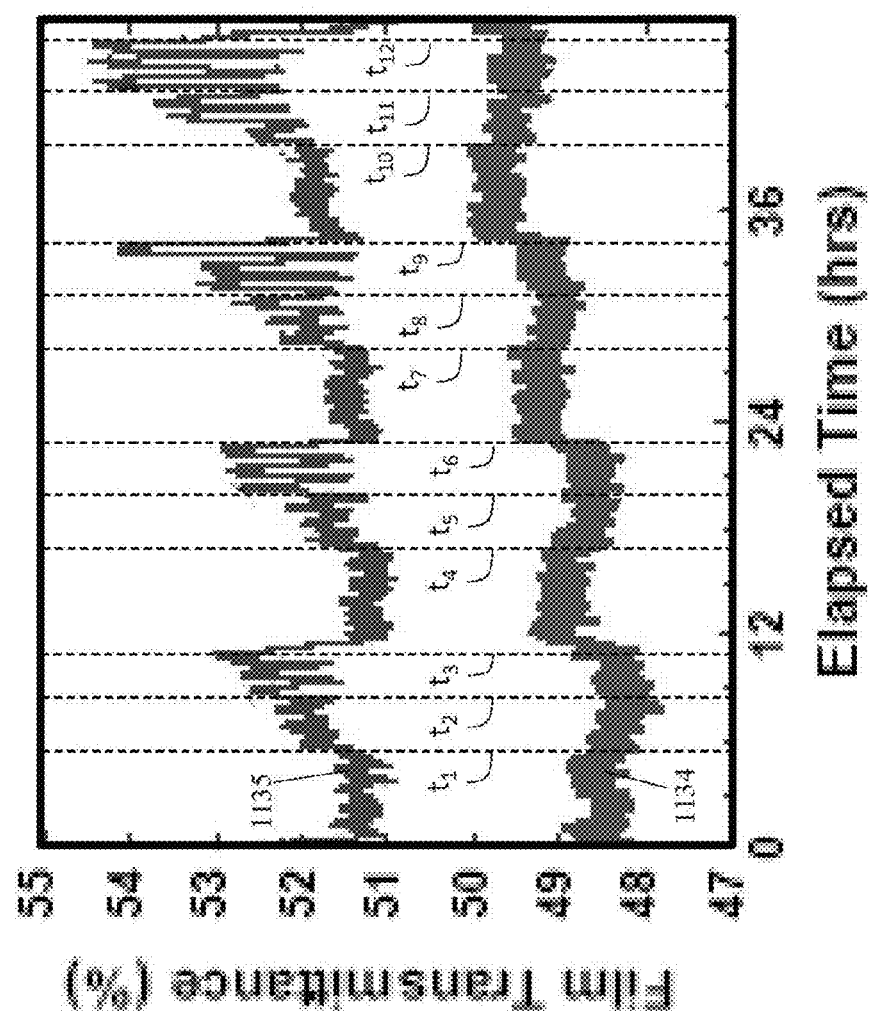
FIG. 11 illustrates the change in transmission characteristics in response to temperature and composition changes at specific wavelengths.

FIG. 11 further illustrates simultaneous temperature and gas sensing using the temperature sensing material where the plurality of nanoparticles comprise Au and the dielectric matrix is $TiO_2$. At FIG. 11, temperature monitoring is conducted using a wavelength $\lambda_{TEMP}$ of 575 nm with transmittance (Film Transmittance (%)) indicated as trace 1134, while composition sensing is conducted using a wavelength $\lambda_{GAS}$ of 675 nm with transmittance (Film Transmittance (%)) indicated as trace 1135. Within the terminology of the method disclosed, at FIG. 11, the shift in the optical signal is indicated by a shift at the specific 575 nm wavelength $\lambda_{TEMP}$ while the shift in the second optical signal is indicated by a shift at the specific 675 nm wavelength $\lambda_{GAS}$. At FIG. 11, between 0-$t_3$ the temperature was about 400° C., between $t_3$-$t_6$ the temperature was about 500° C., between $t_6$-$t_9$ the temperature was about 600° C., and between $t_9$-$t_{12}$ the temperature was about 700° C., with about 30 minutes of temperature ramp up following $t_3$, $t_6$, and $t_9$. During these temperatures, gas compositions were varied such that from 0-$t_1$, $t_3$-$t_4$, $t_6$-$t_7$, and $t_9$-$t_{10}$ the $O_2$ content varied from 0-20% against a background $N_2$, and from $t_1$-$t_2$, $t_4$-$t_5$, $t_7$-$t_8$, and $t_{10}$-$t_{11}$ the CO content varied from 0-10% against a background $N_2$, and from $t_2$-$t_3$, $t_5$-$t_6$, $t_8$-$t_9$, and $t_{11}$-$t_{12}$ the $H_2$ content varied from 0-4% against a background $N_2$. As illustrated, shifts in the optical signal indicated by variations at the wavelength $\lambda_{TEMP}$ (trace 1134) may serve to indicate changes in temperature while shifts in the second optical signal indicated by variations at the wavelength $\lambda_{GAS}$ (trace 1135) may serve to indicate changes in composition. Further illustration is provided at FIG. 12 for the Au/$TiO_2$ material, where trace 1236 indicates response at a wavelength of 350 nm for the same temperature and gas composition conditions of FIG. 11.

The temperature sensing material utilized in the method of this disclosure may be prepared using means known in the art for the production of metallic nanoparticles dispersed in a supporting matrix, including sol-gel wet chemistry based techniques, impregnation techniques, implantation techniques, sputtering techniques, and others. See e.g., De, "Sol-Gel Synthesis of Metal Nanoclusters-Silica Composite Films," *J. Sol-Gel Sci. Techn.* 11 (1998); and see Delannoy et al., "Preparation of supported gold nanoparticles by a modified incipient wetness impregnation method," *J. Phys. Chem. B* 110(45) (2006); and see Veith et al., "Magnetron sputtering of gold nanoparticles onto $WO_3$ and activated carbon," *Catal. Today* 122 (2007); and see Garcia-Serrano et al., "Synthesis and characterization of Au nanoparticles in $Al_2O_3$ matrix," *Ini. J. Hydrogen Energ.* 28 (2003), among many others. Generally, rigorous calcination schedules will improve the temperature stability of the resulting temperature sensing material. A high calcination temperature and long calcination time may ensure that the resulting temperature sensing material is properly aged, so that any optical property changes occurring in the material during sensing operations can be attributed to changes in the chemical composition and/or temperature of the monitored stream rather than irreversible changes associated with the nanocomposite temperature sensing material such as coarsening of the metallic particles or changes in the structure of the dielectric matrix. In an embodiment, treatment temperature is ramped and held at a maximum calcination temperature of at least 800° C. In an additional embodiment, treatment temperature is ramped from about 20° C. to about 950° C. over about 10 hours, held at about 950° C. for about 2 hours, and cooled from about 950° C. to about 20° C. over about 3 hours. However, the specific manner in which the temperature sensing material of this disclosure is prepared is not limiting within this disclosure, provided that the temperature sensing material is comprised of metallic nanoparticles dispersed in a dielectric matrix as defined herein.

In embodiments where the temperature sensing material is in thermal communication and/or contact with a fluid stream, the fluid stream may be some portion of a bulk fluid stream, where the fluid stream is separated from the bulk fluid stream by a barrier layer, such as a dense filter layer to act as a diffusion barrier or a sieve material having an average pore size that is tailored to improve selectivity for chemical sensing responses. Such an arrangement may be helpful when the fluid stream is comprised of a molecular constituent which may act to impact the optical signal of the temperature sensing material, and which may need to be excluded from influencing the sensing operation. For example, a sieve material may be utilized to exclude the molecular constituent from the monitored stream by selecting a sieve material having an average pore size less than the molecular diameter of the molecular constituent to be excluded. Exemplary sieves include aluminosilicate minerals, clays, porous glasses, microporous charcoals, zeolites, active carbons, or synthetic compounds which display a standardized average pore size, such as pore size 3A, pore size 4A, etc. In a similar manner, the dense filter layer can be selected such that the diffusion of a species to be excluded is relatively sluggish. An appropriately defined barrier layer can also protect the underlying temperature sensing layer from the presence of particulates and undesirable corrosive species that may have a deleterious effect on long term stability of the sensing layer. In an embodiment, a first surface of a barrier material is contacted with a bulk gas stream, and a fluid stream is withdrawn from a second surface of the barrier material.

Thus, provided here is a method for detecting a change in the temperature of a temperature sensing material which utilizes a shift in the optical signal generated by the temperature sensing material. The temperature sensing material is comprised of a plurality of metallic nanoparticles dispersed in a dielectric matrix. In an embodiment, the method is additionally capable of simultaneous monitoring the change in temperature and a change in the chemical composition of a fluid stream in contact with the temperature material.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of detecting a change in a temperature of a temperature sensing material comprising:
   illuminating the temperature sensing material with a light source emitting incident light, where the temperature sensing material is comprised of,
   a dielectric matrix, where the dielectric matrix is stable at the temperature of the temperature sensing material, and where the dielectric matrix has a first electronic conductivity at the temperature of the temperature sensing material,
   a plurality of metallic nanoparticles dispersed in the dielectric matrix, where an individual metallic nanoparticle in the plurality of metallic nanoparticles has a second electronic conductivity, where the second electronic conductivity is greater than $10^{-1}$ S/cm at the temperature of the temperature sensing material, and where the first electronic conductivity is at least two orders of magnitude less than the second electronic conductivity, and where the plurality of metallic nanoparticles have an average nanoparticle diameter of less than about 500 nanometers;
   collecting exiting light, where the exiting light is light that originates at the light source and is transmitted, reflected, scattered or a combination thereof by the temperature sensing material;
   monitoring an optical signal based on a comparison of the incident light and the exiting light using optical spectroscopy; and
   detecting a shift in the optical signal, thereby detecting the change in the temperature of the temperature sensing material.

2. The method of claim 1 where the plurality of metallic nanoparticles are comprised of a conducting metal oxide.

3. The method of claim 1 where the dielectric matrix is comprised of $SiO_2$, $Al_2O_3$, $Si_3N_4$, $ZrO_2$, $MgF_2$, or mixtures thereof.

4. The method of claim 1 where the shift in the optical signal is a shift in the optical signal edge.

5. The method of claim 1 where the average nanoparticle diameter is less than about 100 nanometers.

6. The method of claim 5 where the temperature of the temperature sensing material is greater than or equal to 500° C.

7. The method of claim 1 where the optical signal does not exhibit a plasmon resonance peak.

8. The method of claim 7 where the plurality of metallic nanoparticles are comprised of Pd, Pt, Ir, Rh, Ru, Os, or alloys thereof.

9. The method of claim 1 where the second electronic conductivity is greater than $10^2$ S/cm at the temperature of the temperature sensing material.

10. The method of claim 9 where the first electronic conductivity is at least three orders of magnitude less than the second electronic conductivity.

11. The method of claim 1 where the optical signal exhibits a plasmon resonance peak.

12. The method of claim 11 where the shift in the optical signal is a change in the plasmon resonance peak.

13. The method of claim 11 where the plurality of metallic nanoparticles are comprised of Au, Ag, Al, Cu, or alloys thereof.

14. The method of claim 1 further comprising:
    placing the temperature sensing material in contact with a fluid;
    monitoring a second optical signal based on the comparison of the incident light and the exiting light using optical spectroscopy; and
    detecting a shift in the second optical signal, thereby detecting a change in a chemical composition of the fluid.

15. The method of claim 14 where the shift in the second optical signal is a shift in an optical signal edge.

16. The method of claim 14 further comprising:
    designating a first plurality of wavelengths;
    designating a second plurality of wavelengths;
    detecting the shift in the optical signal using the first plurality of wavelengths; and
    detecting the shift in the second optical signal using the second plurality of wavelengths.

17. The method of claim 16 where the first plurality of wavelengths is a first set of wavelengths and where the second plurality of wavelengths is a second set of wavelengths, and where the first set of wavelengths is not equal to the second set of wavelengths.

18. The method of claim 17 where the first set of wavelengths is comprised of a wavelength $\lambda_{TEMP}$ and where the second set of wavelengths is comprised of a wavelength $\lambda_{GAS}$, and where the wavelength $\lambda_{TEMP}$ is not equal to the wavelength $\lambda_{GAS}$.

19. A method of detecting a change in a temperature of a mass using the method of claim 1 further comprising placing the temperature sensing material in thermal communication with the mass.

* * * * *